(12) United States Patent
Del Core

(10) Patent No.: US 12,466,293 B2
(45) Date of Patent: *Nov. 11, 2025

(54) THERMAL MANAGEMENT OF A COMPONENT OF ELECTRICAL POWER SYSTEM, CONTROLLER, SYSTEM, AND METHOD

(71) Applicant: Robert Del Core, San Diego, CA (US)

(72) Inventor: Robert Del Core, San Diego, CA (US)

( * ) Notice: Subject to any disclaimer, the term of this patent is extended or adjusted under 35 U.S.C. 154(b) by 205 days.

This patent is subject to a terminal disclaimer.

(21) Appl. No.: 17/989,233

(22) Filed: Nov. 17, 2022

(65) Prior Publication Data
US 2023/0131786 A1     Apr. 27, 2023

Related U.S. Application Data

(63) Continuation of application No. 17/027,669, filed on Sep. 21, 2020, now Pat. No. 11,511,647, which is a
(Continued)

(51) Int. Cl.
*B60L 9/00*     (2019.01)
*B60L 8/00*     (2006.01)
(Continued)

(52) U.S. Cl.
CPC .............. *B60L 58/24* (2019.02); *B60L 8/006* (2013.01); *B60L 50/10* (2019.02); *B60L 50/40* (2019.02); *B60L 58/26* (2019.02); *B60L 58/27* (2019.02); *B60L 58/40* (2019.02); *H01M 10/44* (2013.01); *H01M 10/613* (2015.04); *H01M 10/625* (2015.04); *H01M 10/63* (2015.04); *B60L 2240/42* (2013.01); *B60L 2240/545* (2013.01);
(Continued)

(58) Field of Classification Search
CPC .......... B60L 58/24; B60L 58/27; B60L 58/40; B60L 50/10; B60L 50/40; B60L 58/26; B60L 8/006; B60L 2240/42; B60L 2240/545; B60L 2240/547; B60L 2240/549; B60L 2240/662; H01M 10/613; H01M 10/625; H01M 10/63; H01M 10/44; Y02T 10/70; Y02T 10/72; Y02T 90/16

See application file for complete search history.

(56) References Cited

U.S. PATENT DOCUMENTS

| | | | |
|---|---|---|---|
| 6,271,643 B1* | 8/2001 | Becker | H02J 7/00047 320/112 |
| 2012/0321917 A1* | 12/2012 | Kazuno | B60L 50/51 429/9 |
| 2013/0052490 A1* | 2/2013 | TenHouten | B60H 1/00278 429/50 |

* cited by examiner

*Primary Examiner* — Adam M Alharbi
(74) *Attorney, Agent, or Firm* — Enrique A. Monteagudo

(57) ABSTRACT

Aspects of the present disclosure are directed to systems, devices, methods, and computer-readable storage medium for adaptive/dynamic thermal management of an electrical power system having variable electric loads, and components thereof. Thermal management may be driven at least partially by predicted/modeled thermal performance of the component to be managed, which may be calculated or modified using direct or indirect measurements. Embodiments may include adaptive thermal management of at least one of an energy storage system and an electric energy supply. Applications of this disclosure may include adaptive thermal management method for electric vehicles and non-mobility applications, particularly having variable electrical loads, which may impact performance or life of the application.

33 Claims, 11 Drawing Sheets

Related U.S. Application Data continuation of application No. 15/726,397, filed on Oct. 6, 2017, now Pat. No. 10,780,786, which is a continuation-in-part of application No. 14/035,482, filed on Sep. 24, 2013, now Pat. No. 9,827,871.

(60) Provisional application No. 61/704,891, filed on Sep. 24, 2012.

(51) Int. Cl.

| | | |
|---|---|---|
| *B60L 50/10* | (2019.01) | |
| *B60L 50/40* | (2019.01) | |
| *B60L 58/24* | (2019.01) | |
| *B60L 58/26* | (2019.01) | |
| *B60L 58/27* | (2019.01) | |
| *B60L 58/40* | (2019.01) | |
| *H01M 10/44* | (2006.01) | |
| *H01M 10/613* | (2014.01) | |
| *H01M 10/625* | (2014.01) | |
| *H01M 10/63* | (2014.01) | |

(52) U.S. Cl.
CPC ... *B60L 2240/547* (2013.01); *B60L 2240/549* (2013.01); *B60L 2240/662* (2013.01); *Y02T 10/70* (2013.01); *Y02T 10/72* (2013.01); *Y02T 90/16* (2013.01)

THERMAL MANAGEMENT OF A COMPONENT OF ELECTRICAL POWER SYSTEM, CONTROLLER, SYSTEM, AND METHOD

RELATED APPLICATIONS

This application claims priority to U.S. patent application Ser. No. 17/027,669 filed on Sep. 21, 2020; which claims priority to U.S. patent application Ser. No. 15/726,397 filed on Oct. 6, 2017, claims priority to U.S. patent application Ser. No. 14/035,482 filed on Sep. 24, 2013, which claims priority to U.S. Provisional Application No. 61/704,891, filed on Sep. 24, 2012, all of which are incorporated by reference herein in their entirety.

BACKGROUND

1. Technical Field

Aspects of the present disclosure generally relate to systems, devices, and methods of thermal management of electrical power systems, and more particularly to thermal management of heavy duty electrical power systems having variable electric loads.

2. Related Art

As referred to herein, a typical electrical power system includes a traditional electric energy supply (e.g., where electricity is supplied via a generator, fuel cell chemical reaction, photovoltaic conversion, and/or grid supply), and an electric load (e.g., static, variable, or a combination thereof) to be powered. Similarly, electrical power systems, incorporating alternative energy generators, typically include an energy collector (e.g., wind, solar, hydro, etc.) and an electricity generator (e.g., shaft-driven generator, photovoltaic cells, etc.), together acting as an electric energy supply, and where the energy may be stored for later use, or may supply an electric load directly. Both, will typically have at least one of an energy storage (e.g., energy is stored in batteries, ultracapacitors, mechanical energy storage, state change energy storage, etc.) and power electronics/electricity converter (e.g., inverter, rectifier, DC-to-DC converter, etc.).

Many electrical power systems (particularly heavy duty systems like heavy duty electric vehicles) generate excessive heat in at least one of various locations of the system, and that heat must typically be removed from the system, if only to improve system performance. Oftentimes, this heat removal must be active to be effective. Active heat removal typically requires energy to operate, which is therefore not available for system performance. A heavy-duty vehicle can be generally defined to include (a) any commercial medium or heavy-duty on-highway vehicle or a work truck, as defined in 49 U.S.C. 32901(a)(7) and (19), and may be classified as Heavy-duty pickup trucks and vans; Heavy-duty vocational vehicles; Truck tractors with a GVWR above 26,000 pounds; and Heavy-duty trailers.

"Steady state electric systems" (here, having constant or slowly changing current flow or otherwise regular current duty cycles) typically operate under conditions that are predictable and easy to optimize for heat removal. "Variable state electric systems" (here, having fast changing current flow, variable loads, and/or otherwise irregular current duty cycles), on the other hand, are typically less predictable and frequently require heat removal that is both active and dynamic or otherwise variable. Variable state electric systems may be found in Electric powered vehicles, Windmills, Power generation systems (stationary and mobile), Grid energy storage, to name a few.

Electric powered vehicles for transportation offer reduction of harmful emissions in our environment, improved fuel economy and strengthened security of energy supply. Generally speaking, electric vehicles (EVs) may include road and rail vehicles, surface and underwater vessels, electric aircraft and electric spacecraft. An EV may be powered by stored energy, generated energy, or a combination of both. Onboard energy is commonly generated using an internal combustion engine, a fuel cell, solar cells, etc. Typically, an electrical energy storage system is required to power electric vehicles. Other components that make up the rest of the drive system include traction motor(s) interfaced to the vehicle wheel system, high and low voltage power electronics, electrically powered accessories, system controls and vehicle interface.

FIG. 1 is a schematic diagram of conventional fuel cell system 120, for reference. A fuel cell produces electrical energy from the chemical energy of reactants through an electrochemical process. A Proton Exchange Membrane (PEM) fuel cell is a type of fuel cell including an anode, cathode, an electrolyte membrane with catalyst, gas diffusion media to form a fuel cell. Fuel cells are arranged to form fuel cell stacks that provide the voltage and current to a variable load. Hydrogen is supplied to the anode and oxidizing gas such as oxygen in ambient air is supplied to the cathode, and electrochemical reactions yield heat, water and electricity. The flow of reactants is controlled to provide electrical energy to a variable load. PEM fuel cell membrane must be humidified for high performance and can be impacted by improper water balance. Heat generated in the fuel cell must be carefully managed to ensure optimal operating conditions which is important for high efficiency and durability. Too high operating temperature can lead to drying of the membrane, while too low operating temperature can lead to flooding that reduce overall performance and may damage the fuel cell. Precise control of reactant gases is also required for high performance.

A fuel cell system generally includes a variety of components, including but not limited to, fuel cells, fuel cell stack or module, dedicated thermal management system for the stack including coolant pump, piping for thermal fluid connections, heat exchangers, fans, cooling connections, and other ancillary components such as air delivery system for supply of reactant air to the cathode, and hydrogen fuel subsystem for the supply of reactant hydrogen fuel to the anode. In a vehicle, the fuel cell system may be electrically connected directly to power a variable load, or connected with an energy storage system to power a variable load. Fuel cell systems typically include a dedicated thermal management system for the fuel cells.

Energy storage systems are made up of a plurality of energy storage cells connected electrically to form a stack or module of cells configured in series or parallel to provide power and energy required for an application. Energy storage cells are typically battery cells or ultracapacitor cells. Depending on the power and energy granularity of the stack, there are stacks electrically connected in a system. In use under a typical charge/discharge current duty cycle, the battery cells produce heat which must be controlled in order to maximize life of the elements and minimize the risk of thermal runaway. Electric energy storage systems may have higher performance and longer life when sufficiently cooled. Thermal management of electric energy storage systems may present unique challenges when the current duty cycle of the energy storage system is variable, such as in an electric vehicle. Further, thermal management may be beneficial in other energy systems having variable or otherwise irregular current duty cycles, such as vehicle to grid power supply, windmills, electric lifts, large user-operated electric equipment, etc.

To optimize the safety, reliability, performance, active thermal management systems are often incorporated into the energy storage system (ESS). Active thermal management is generally accomplished by circulating a heat exchange fluid such as air or liquid or other media, using integrated Heating, Ventilation, and Air Conditioning (HVAC) units, or hybrid internal air circulation in conjunction with a water-based chiller system, or Peltier thermal electric systems. It is understood that HVAC is used broadly herein to include heat systems, cooling systems, ventilation systems, and any combination thereof. Further, any HVAC system that is capable of adding or removing sufficient heat to an energy storage cell can be used with this present embodiment. Examples of different cooling circuit topologies in prior art used for thermal conditioning include liquid cooling loops to liquid air heat exchanger, air circulation, internal air circulation with air/water heat exchanger, dual cooling loops connected via a water heat exchanger are some commonly used topologies.

As an ESS is charged and discharged during use, heat is generated in the battery cells due to the cells internal resistances which ultimately results in a rise of temperature. If the heat is not rejected sufficiently fast or if the battery is allowed to operate outside of specified limits the battery will suffer reduced life, efficiency and performance, and ultimately fail. An active thermal management system is generally required to control the temperature so as to maintain the cell temperatures within an optimal temperature range. The optimal temperature range is normally prescribed by the energy storage cell manufacturer. Power is required to run the HVAC system which impacts the overall driving range and efficiency of the electric vehicle.

It is well known that battery life and capacity is extremely sensitive to temperature, requiring that the battery cells be operated within a well-defined temperature band. Conventional systems monitor every cell in a battery pack which increases packaging complexity and cost, and potential failure points. In addition, control methods have logic algorithms that are based on conservative threshold approach where corrective actions are based on readings that approach preset levels, which often result in an overshoot of target temperatures requiring aggressive compensation from the thermal management system, thus a reduction in efficiency. Such methods present the risk that operating limits are exceeded thus presenting a warranty issue with the battery cell supplier, reduced battery life, excess balancing required from the BMS due to thermal imbalances and swings.

In a conventional cooling system, an electronically controlled valve or other flow control device may control the temperature of a coolant at one point in the system, such as at the entry point of the coolant into the propulsion system of a vehicle, for example. The temperature of the coolant at this point in the system, known as the valve temperature, can be measured by a temperature sensor. The valve or other flow control device may control the valve temperature of the coolant at this point, according to a target temperature or valve setpoint temperature (the temperature "setpoint"), by varying the ratio of the quantity of coolant flowing through a radiator or other heat exchanger to the quantity of coolant bypassing the radiator or heat exchanger and flowing into the propulsion system of the vehicle.

Likewise, with a fuel cell, the temperature of the coolant at the entry point of the fuel cell stack is called "fuel cell stack coolant inlet temperature". The coolant temperature at the exit point of the fuel cell stack is called the "fuel cell stack coolant outlet temperature". Temperature sensor is located primarily at the outlet of the stack coolant port, and sometimes both inlet and outlet of the stack coolant ports. Temperature control for fuel cell power system are also done by coolant flowrate control with either 2 way or 3 way valve, variable speed coolant flow pump, fans, and combinations thereof.

BRIEF SUMMARY OF THE INVENTION

Aspects of the present invention are directed to systems, devices, and methods for adaptive/dynamic thermal management of an electrical power system having variable electric loads, and components thereof. An application of this invention also pertains to thermal management methods for electric vehicles and non-mobility applications. Thermal management may be driven at least partially by predicted/modeled thermal performance of the component to be managed, which may be calculated or modified using direct or indirect measurements.

A controller for thermal management system of a component of an electrical power system is disclosed herein. The controller includes a communication module configured to communicably couple with the thermal management system and the electrical power system, the communication module further configured to receive a current input signal indicative of a current provided by the electrical power system; a memory module configured to store a thermal management logic; and a processor module communicably coupled to the communication module and the memory module. The processor module is configured to implement the thermal management logic where: an average current provided by the electrical power system over a predetermined period of time is calculated using the current input signal, a thermal control signal of the thermal management system is generated based on the calculated average current, and the thermal control signal is communicated to the thermal management system via the communication module, said thermal control signal operative to cause the thermal management system to regulate a thermal state of the component of the electric energy storage system.

According to one embodiment a thermal management system for a component of an electrical power system is also disclosed herein. The thermal management system includes: the abovementioned controller; a coolant energizer configured to pump a coolant through the thermal management system; a component outlet plumbing configured to communicate the coolant out of the component of the electrical power system; a heat exchanger fluidly coupled to the component outlet plumbing, the heat exchanger configured to extract heat from the coolant; and a component inlet plumbing fluidly coupled to the heat exchanger, the component inlet plumbing configured to communicate the coolant into the component of the electrical power system.

According to one embodiment a method for thermal management of a component of an electrical power system is also disclosed herein. The method includes the steps of: providing the abovementioned thermal management system; reading the current input signal indicative of the current provided by the electrical power system, via the communication module of the controller; computing the time average current provided by the electrical power system over a predetermined period of time, using the current input signal and via the processor module of the controller; generating the thermal control signal of the thermal management system based on the computed average current signal and via the processor module of the controller; and activating the thermal management system so as to regulate a thermal state of the component of the electric energy storage system, using the thermal control signal and via the communication module of the controller.

DETAILED DESCRIPTION

Figure 1:
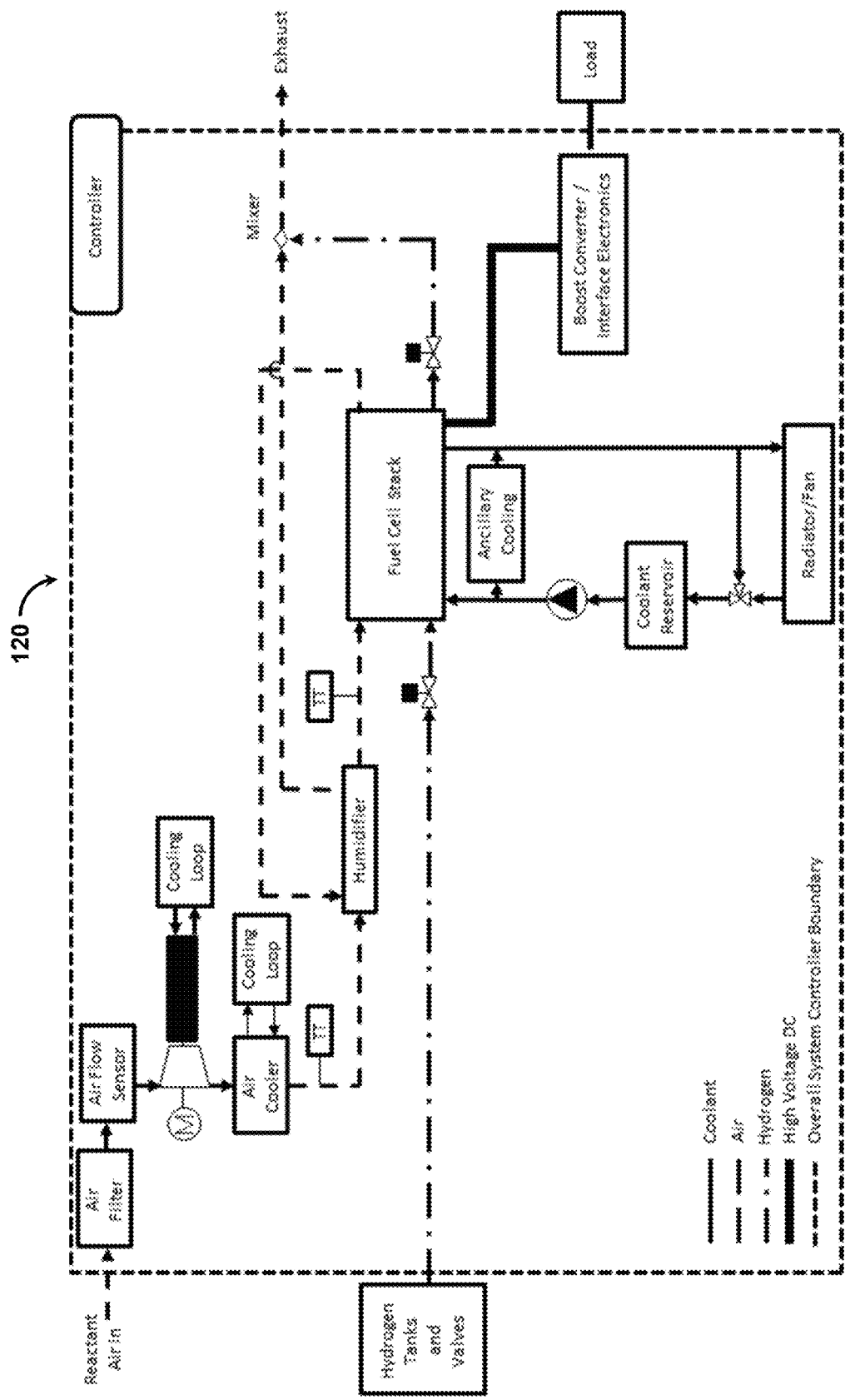
FIG. 1 is a schematic diagram of conventional fuel cell system, for reference.

Aspects of the present disclosure are directed to systems, devices, methods, and computer-readable storage medium for adaptive/dynamic thermal management of an electrical power system having variable electric loads. In one embodiment, the disclosure may include at least one of an energy storage system and an electric energy supply, and an adaptive thermal management system. Embodiments may include a system, device, and method to dynamically manage heat in an electric energy storage system. Similarly, embodiments may include a system, device, and method to dynamically manage heat in an electric energy supply. The energy storage system may include an energy storage module connectable to a load. The electric energy supply may be configured to charge an energy storage module and/power a load.

Aspects of the present disclosure pertain generally to the field of thermal management systems for an electric energy storage system such as a battery pack or ultra-capacitor pack system for use in system or device having variable electric load. Aspects of this disclosure pertain to a thermal management method for an electrical energy storage (ESS), which may utilize an electric energy storage system such as batteries, ultra capacitors, or combinations thereof. For example, aspects of the present disclosure relate to a system and method of efficiently controlling the temperature of an electric energy storage system having thermal considerations that may affect performance and life, such as in an electric vehicle or heavy duty/high power electric equipment.

Aspects of the present disclosure are directed to a thermal management method for electric vehicles and for non-mobility applications. As such, one application of this disclosure pertains to electric vehicles, such as automobiles, light duty commercial vehicles, heavy duty commercial vehicles such as transit buses, material handling equipment such as port cranes, trucks and forklifts. Likewise, another application of this disclosure pertains to non-mobility applications such as grid energy storage, remote power and backup power systems, and wind turbine power generators for pitch control and line power stabilization to name a few. In particular, this embodiment has great applicability in the field of electric vehicle energy storage thermal management where high current duty cycles are typically encountered.

Aspects of the present disclosure include the realization that active thermal management systems should be extremely efficient since they may present themselves to the overall system as a significant parasitic load. For example, in a mobility application such as an electric vehicle, the overall range of the electric vehicle can be reduced since active thermal management systems consume a great deal of energy. In addition, depending on the current duty cycle, battery temperatures can continue to rise for a short period of time even once the battery current has been cut or reduced.

Consequently, embodiments of the disclosure may include: (1) an efficient system, method and apparatus for maximizing the life of a battery pack without increasing cost, (2) an efficient system, method and apparatus that maximizes overall electric vehicle range by predicting the anticipated setpoint required for thermal management, actuating a device in a manner that tracks the overall duty cycle of the vehicle, and (3) an efficient system, method and apparatus that allows for the reduction of battery temperature sense hardware and associated wiring. The present disclosure provides such a method.

Figure 2:
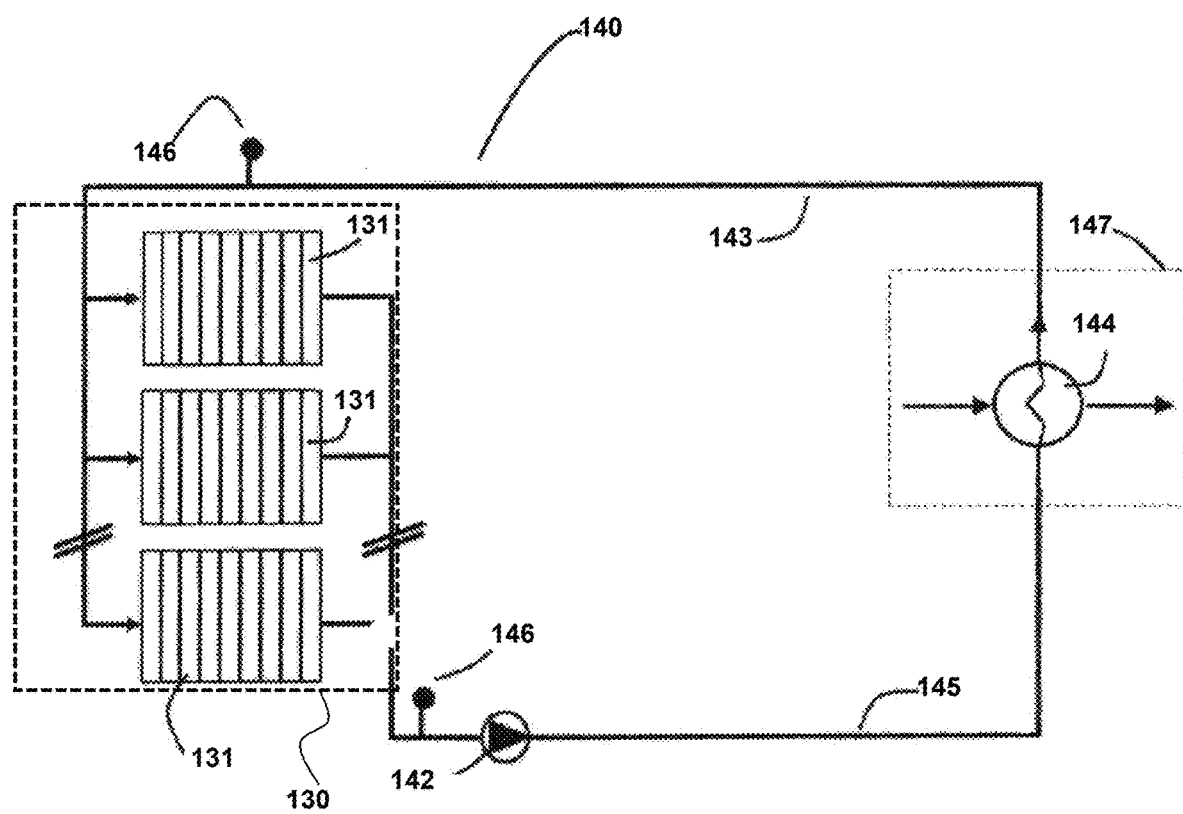
FIG. 2 is a schematic diagram of an exemplary adaptive thermal management system, according to one embodiment of the present disclosure.

FIG. 2 is a schematic diagram of an exemplary adaptive thermal management system, according to one embodiment of the present disclosure. In particular, a thermal management loop (sometimes called a HVAC system) is depicted here as used to heat and/or cool an electric energy storage system (ESS). The adaptive thermal management system 140 may include thermal management loop (pipe system 143 and 145) thermally coupled to the electronic component to be cooled (here an energy storage system—ESS), and may be communicably coupled to one or more sensors and one or more controllers (see e.g., adaptive thermal management controllers 150, 135, 1150 in FIGS. 8-11).

While the ESS is illustrated as the electronic component to be cooled, it should be understood that the teachings herein may be applied to many other modules or components to be cooled, particularly where having multiple internal temperature sensors would present technical challenges or increase costs, where module thermal response can be correlated to a load demand (e.g., current), where thermal response modeling is available, and/or where the component to be cool is susceptible to change/degrade thermal performance dynamically (e.g. due to age, use, environment, etc.). For example, these components may include, inter alia, electric motors, power electronics, fuel cell air systems (or components thereof), and the like. Further, it is generally known that battery energy storage systems can lose capacity with low temperature.

It should be also understood that herein, "battery" and/or "cells" are used to refer to a variety of energy storage chemistries that include all lithium based cell technology, lithium ion capacitors, EDLCs, NiMH batteries, Zinc, or any other. Similarly, "battery modules" are a plurality of cells electrically connected to each other, in an envelope that contains the plurality of cells. Cells can be of a variety of form factors such as cylindrical, pouch or prismatic. "Battery pack" is a plurality of modules electrically connected in series and/or parallel. "Energy Storage System" or "ESS" is used to refer to the entire battery pack assembly that has the ability to be charged and discharged for the purpose of powering an electric vehicle.

As illustrated, the ESS may include a plurality of battery modules 131, which may include battery cells connected electrically to each other. A cooling or heating fluid or gas which provides thermal conditioning may be circulated through the battery modules 131 and pipe system 143 and 145 in a closed loop. Pump 142 provides the means of circulating the fluid through the network. The thermal management loop may be hydraulically configured in parallel, as shown, for example to minimize the buildup of thermal gradients and also minimize pumping losses. Exemplary sensors 146 upstream and downstream of the battery modules may be used for purposes of diagnostics and control, and even redundancy.

According to one embodiment, the component to be cooled may be actively cooled. In particular, the cooling may be provided by a dedicated cooling sub-system (e.g., ESS cooler), a general/overall cooling system (e.g., vehicle cooling system), a shared cooling system (e.g., EV drive cooling system), and any combination thereof. As shown here, the pump 142 circulates fluid heated by the HVAC system connected to heat exchanger 144 under charge. In an alternate embodiment, an in-line immersion heater may be incorporated into the thermal loop with various flow control devices. In operation, heat may be transferred to and from the thermal management loop (pipe system 143 and 145) via heat exchanger interface/communication boundary 147. Any device or system that is capable of adding and/or removing heat can be shown to connect with heat exchanger 144. These devices include, but are not limited to: fans, radiators, thermoelectric generators, refrigeration units, or others. According to one embodiment, the battery (ESS) can be pre-cooled or pre-heated while charging from an electrical grid.

According to one embodiment, the adaptive thermal management system 140 may be configured for regulation of operating temperature within prescribed limits (e.g., indicated by a battery manufacturer). The adaptive thermal management system 140 may be configured to receive an input signal measuring a parameter indicative of current drawn from a battery, to receive an input signal measuring a process parameter of cell temperature useful in the operation of the adaptive thermal management system 140, to receive an input signal measuring a process parameter of ambient temperature for operation of the adaptive thermal management system 140, to receive an input signal from a control device (e.g., adaptive thermal management controller, vehicle controller, etc.) that requests current be drawn from the battery at a specific time, at a specified current, and to output the allowable current to be drawn to a vehicle controller. In some embodiments, the input and output signals are discrete.

For the purpose of illustrating the embodiment, the HVAC system that interfaces to heat exchanger 144 is sufficiently sized to remove or add the required heat into the thermal circuit. Based on an exemplary cell manufacturer's data, temperature operating limits will be taken herein to be between 15 and 30 degrees Celsius. It is understood, the disclosure's operating band can be tuned to fit the chemistry of the energy storage.

If required, the energy storage system can be pre-conditioned before use while charge connected to the grid to ensure optimal re-charge conditions and that fully capacity is attained. To illustrate, prior to use, the battery system 130 may be preconditioned (i.e., thermally conditioned) to some temperature value within the battery cell manufacturer's prescribed temperature range. For example, in cases when ambient temperatures are higher than the manufacturer's range, the charge control logic of the controller can cool the battery pack to desired levels before charging commences. Conversely, and also for example, in cases when ambient temperatures are lower than the manufacturer" range, the vehicle's charge controller logic can activate a heating system that is part or the HVAC system (or otherwise interfaced to heat exchanger 144 via heat exchanger interface/communication boundary 147) to heat the batteries.

Battery thermal preconditioning can be accomplished with logic (e.g., in the controller) that observes the ambient temperature during grid connected charging or charging from another source. The HVAC system draws power from the a power supply (e.g., grid, onboard battery, etc.) to heat the battery 131 to an optimal temperature before charging begins.

The occupant's cabin of the vehicle may also be thermally conditioned, where pre-heating of the interior and pre-cooling of the interior is performed during ESS charge to maximize driver and passenger comfort, and maximize vehicle range. For example, once the battery is preconditioned, the HVAC system can be used to condition the cabin. According to one embodiment, if the vehicle is participating in a vehicle-to-grid application ("V2G"), where the load center is the grid instead of a traction motor, the grid may be used to precondition the battery and/or the cabin.

In some embodiments, the adaptive thermal management system 140 may include a control unit (see e.g., adaptive thermal management controllers 150, 1150 in FIGS. 8-11) configured to thermally regulate an electrical energy storage system (ESS), including (1) actuation of contactors to connect the energy storage system to a load or power source such as the utility grid or an auxiliary power unit and (2) to limit current drawn from the energy storage device if temperature limits are exceeded. Accordingly, the adaptive thermal management system 140 may include a communication interface, a processor and an actuator. The method may include acquiring a plurality of values based on an operating profile and parameter values that are indicative of current, and setting operating value thresholds. In some embodiments, the adaptive thermal management system 140 (e.g., via its controller) is connectible to an existing communication control network (e.g., CAN bus of a vehicle) without modification of other devices on that control network (e.g., "plug-n-play").

Figure 11:
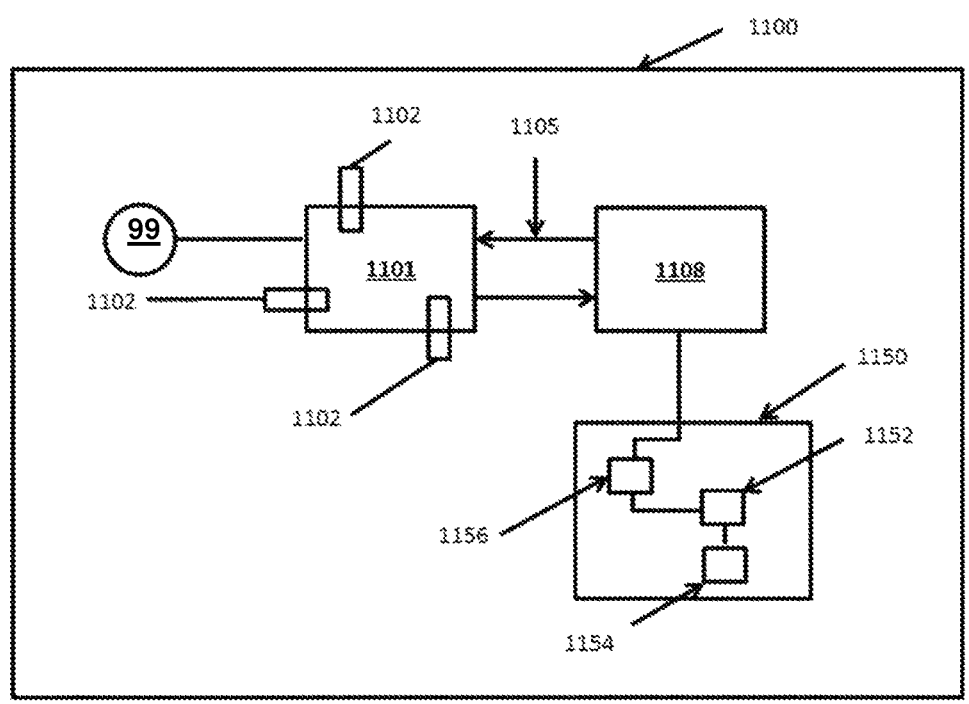
FIG. 11 is a schematic diagram of a thermally managed electric component (energy storage system) for a variable electric load, according to an exemplary embodiment of the present disclosure.

In some embodiments, the adaptive thermal management system 140 may include a computation device and a storage device (see e.g., FIG. 11). The storage device may be configured to store a computed value to be used in calculating a temperature setpoint. The computation device may be configured to compute an averaged current from the energy storage system. In some embodiments, the computation device is further configured to compute a partial differential equation or "PDE" (e.g., partial differential transient heat equation for the generation of control signal).

In some embodiments, the computation device is further configured to compute a multidimensional transient heat/energy equation which may also include a numerical representation of the entire adaptive thermal management system 140 connected with the energy storage system for the generation of a control signal. In another embodiment, the computation device is further configured to compute a system of partial differential continuity, momentum and energy equations (e.g., Navier-Stokes equations) representing the energy storage system and the thermal management system for the generation of a control signal.

In some embodiments, the adaptive thermal management system 140 may include an actuator (e.g., in the form of a dry contact, PWM signal generator, or relay center), that interfaces to the vehicle HVAC system and commands the vehicle HVAC system. For example, the actuator may be integrated in a controller of the adaptive thermal management system 140 (see e.g., FIG. 8).

The embodiments thus may include a communication interface, a processor and an actuator. The method then may generally include acquiring a plurality of values based on an operating profile and parameter values that are indicative of current, and setting operating value thresholds. For example, the embodiments may include a control unit configured to indirectly thermally regulate an electrical energy storage system (ESS), including (1) actuation of contactors to connect the energy storage system to a load or power source such as the utility grid or an auxiliary power unit and (2) to limit current drawn from the energy storage device if temperature limits are exceeded.

According to one embodiment, the adaptive thermal management system 140 may be configured to thermally regulate and operate an electric energy storage module. In particular, the adaptive thermal management system 140 may include, a measurement device or input signal for measuring a parameter such as battery current or parameter indicative of the load, or in units of Amps or operating profile; a calculation device to compute expected temperature rise of the cell in the system in response to a load or anticipated load; a calculation apparatus to compute the one dimension partial differential heat equation to determine the average cell temperature which is used in operation and thermal regulation of the energy storage system; a calculation apparatus to compute a multidimensional partial differential mass, momentum and energy equations to determine the average cell temperature which is used in operation and thermal regulation of the energy storage system; an apparatus to compute and memory device to store a time average value of the load over a user configurable time period. Here, the stored time average value may be used to compute a temperature setpoint for efficient thermal regulation, the measured process parameter indicating load is used to compute temperature setpoint, and the theoretical temperature rise of the cell due to current drawn is used to compute a temperature setpoint for efficient thermal regulation of the energy storage system.

According to one embodiment, a thermal regulation method is disclosed. The method may include measuring the process parameter indicative of the load on the energy storage system; measuring a process parameter indicative of the load that will be requested from the energy storage system; measuring a process parameter indicative of the ambient temperature; computing an average value based on the process parameter indicative of the load on the energy storage system; computing a control rule that is a function of the battery parameters and the process parameters that are indicative of the load on the energy storage system and the load that will requested of the energy storage system before a return command indicating the allowable current draw to the system within the time period and activating a thermal management system to thermally condition the fluid within the required setpoint; solving a partial differential equation within the apparatus control unit for the determination of the average cell temperature signal for read back and control; determining if the average cell temperature is within allowable limits and if so issue a signal allowing the requested current be drawn; and, determining if the average cell temperature is within allowable limits, and if not, issue a command to limit the allowable current that can be drawn in accordance with to the temperature rise term equation (i.e., if the battery is at temp X, allowable temp rise is LIMIT-X, then back out the allowable current based on table lookup).

The method and apparatus may be incorporated into the energy storage package or be embodied in a stand-alone control system, and includes activating the control of a thermal conditioning device based on sampled input signals such as current duty cycle, reference cell temperatures, and the solution of a transient partial differential heat equation that represents the properties of the energy storage cell assembly.

The adaptive thermal management system 140 can be also be applied under "fast charge" scenarios where charge rates are in excess of 1 C resulting from overnight charge to refill the vehicle's energy store, or from rapid acceleration and regeneration scenarios as part of the vehicles normal operation in use. The energy storage system in an electric vehicle such as a heavy duty transit bus, may contain a battery, ultra capacitor, or combination thereof. The energy storage system generally contains a plurality of electrochemical or electrostatic elements for the acceptance, delivery, and storage of electric power.

Figure 3A:
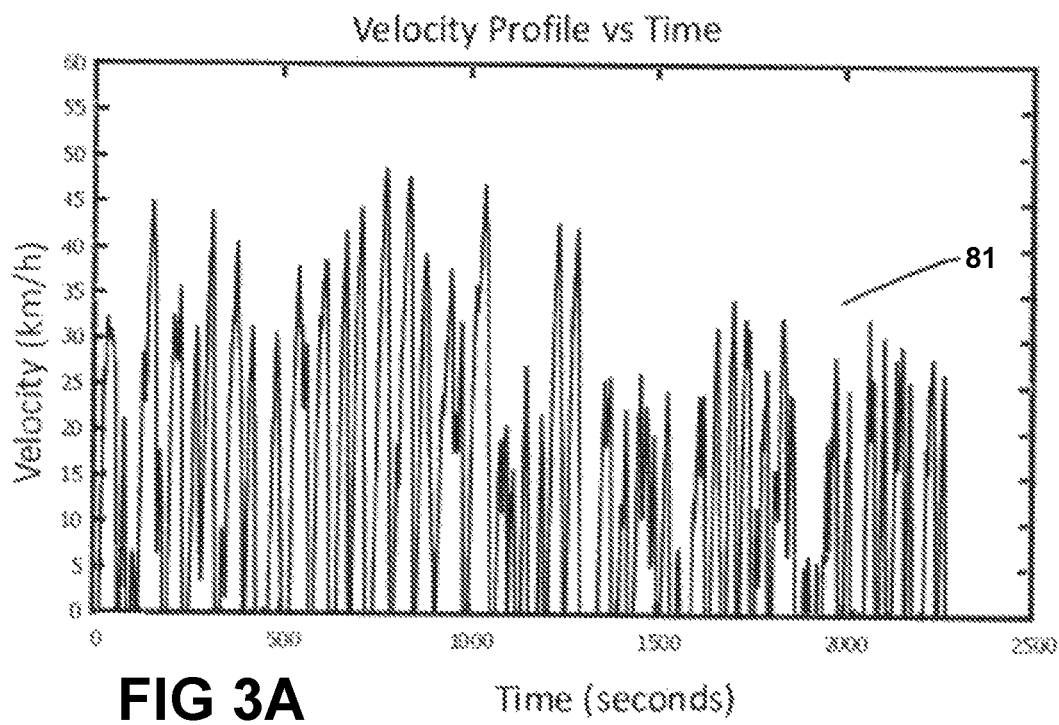
FIG. 3A graphically illustrates an exemplary drive schedule of vehicle velocity-verses-time, for purposes of illustrating the present disclosure.

FIG. 3A graphically illustrates an exemplary drive schedule of vehicle velocity-verses-time, for purposes of illustrating the present disclosure. In particular, a typical drive schedule 81 of vehicle velocity-verses-time has been plotted out. As illustrated, drive schedule 81 has a 2,300 second duration (i.e., 38 min. or 0.64 hr.), which is similar to an inner-city drive cycle that a typical heavy duty transit bus would repeat regularly in revenue service operation. The cycle may be repeated many times in the course of a daily single operating shift. Drive schedules are used to characterize vehicle performance with respect to fuel economy, emissions, range, acceleration and other performance criteria.

Figure 3B:
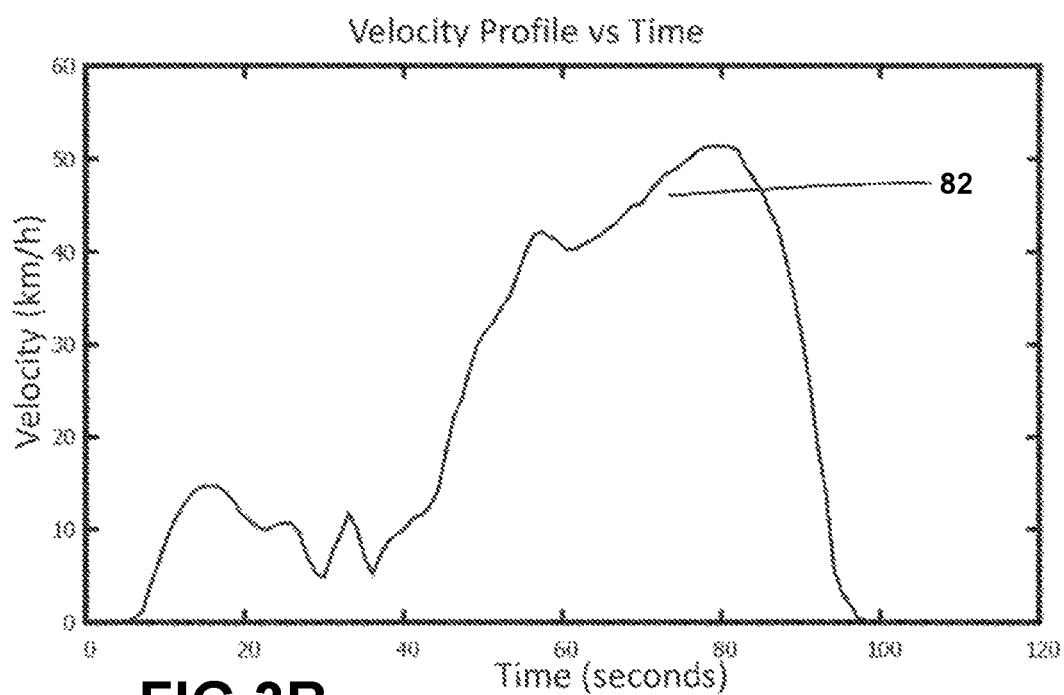
FIG. 3B graphically illustrates a close-up of the exemplary electric drive schedule, for purposes of illustrating the present disclosure.

FIG. 3B graphically illustrates a close-up of the exemplary electric drive schedule, for purposes of illustrating the present disclosure. In particular, a close-up 82 of the drive schedule 81 has been plotted out, showing various, dynamically changing velocity increases and decreases over time.

Figure 3C:
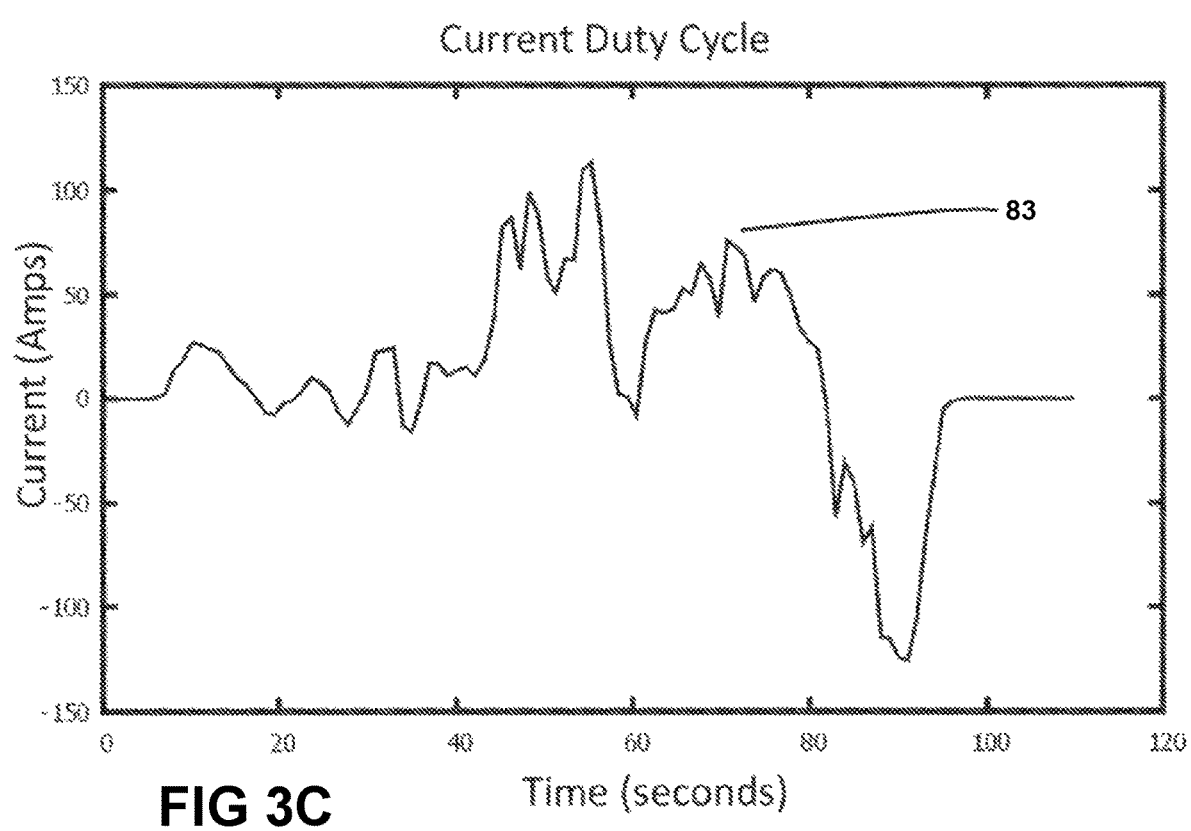
FIG. 3C graphically illustrates a current duty cycle correlated with the aforementioned electric drive schedule, for purposes of illustrating the present disclosure.

FIG. 3C graphically illustrates a current duty cycle correlated with the aforementioned electric drive schedule, for purposes of illustrating the present disclosure. As shown, a current duty cycle 83 (i.e., a duty cycle of the electrical current through the electronic component of interest) is graphically depicted. In particular, the plot shows current-verses-time for a variable state electric system (here, having fast changing current flow, variable loads, and an irregular/variable current duty cycle).

Typically, in order to provide the power required to move the electric vehicle according to a drive schedule, the electric vehicle's propulsion system may draw current from the energy storage system at a rate that correlates to the drive schedule. In particular, the current duty cycle or the amount of current and rate of current that the motors draw form the battery, or put back into the battery during energy recuperation may be a function of the propulsion system characteristics, drive schedule, operating environment, vehicle parameters such a weight, rolling resistance, air resistance to name a few. Current duty cycles from grid utilities load cycles that can also be represented in a time varying manner.

Here, the current duty cycle 83 (also known as an "operating profile") is linked to the aforementioned drive schedule 81 (FIG. 2). For example, in a real world environment, the operating profile may represent actual, measured current (e.g., drawn from a battery propulsion system) when an electric heavy duty vehicle is travelling according to the drive schedule 82 of FIG. 3B. Alternately, in a simulation environment (i.e., in the absence of actual current measurements), the operating profile may be determined by numerical simulation. For example, the operating profile may be an input signal to generate the drive schedule. Also for example, the drive schedule may be an input signal to generate the operating profile. Alternately, in a hybrid environment, the operating profile may be calculated (e.g., by the overall system controller) in response to the drive system's current duty cycle in use. This may be useful in generating an averaged current from the energy storage system.

Figure 4:
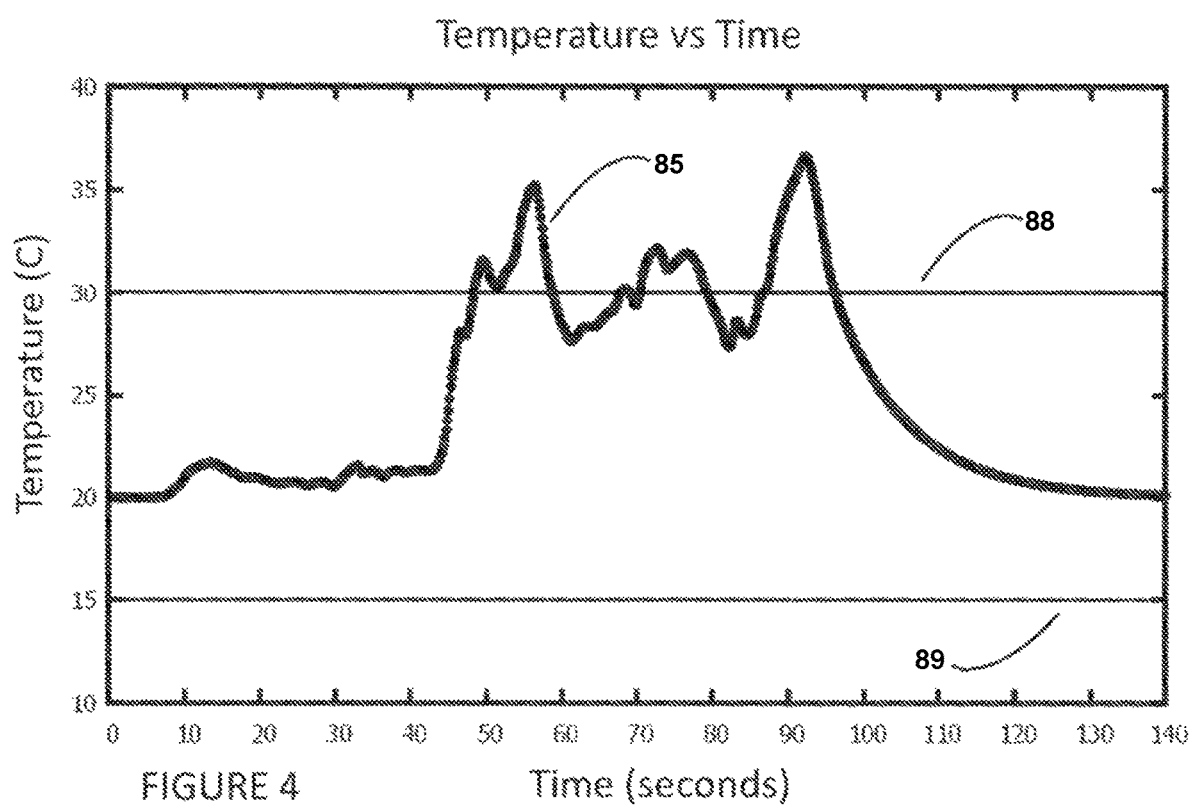
FIG. 4 graphically illustrates a temperature profile of a cell (or module)—without temperature control, for purposes of illustrating the present disclosure.

FIG. 4 graphically illustrates a temperature profile of a component to be cooled, such as an energy storage cell (or module)—without temperature control, for purposes of illustrating the present disclosure. As shown, an average temperature response 85 (e.g., actual or calculated temperature) of the electronic component of interest may be graphically depicted. In particular, the plot shows component temperature-verses-time having passive cooling. For example, the cell support structure inside a battery module is thermally conductive, and thus provides a path for some heat rejection from the battery module for a heat rejection media such as a thermal cooling fluid of the adaptive thermal management system 140 (FIG. 2).

Here, for illustration purposes, the temperature rise as a function of time represents that of a battery cell in a battery pack for an electric heavy duty vehicle is determined by numerical simulation by solving a partial differential heat equation parameterized with thermal characteristics and geometry of the cell and its supporting structure. Further, the current duty cycle 83 (FIG. 3C) is the input to the numerical model of the cell. In other words, here, the component of interest's thermal response is modeled by a measured current drawn, for example, by the vehicle traction motors.

Here in the illustrated example, the average temperature response 85 shows the effect of allowing the regulating temperature to be equivalent to the ambient temperature (here, 20 degrees Celsius). As shown, the temperature of the cell is allowed to fluctuate without active cooling, allowing heat to dissipate to the environment. This may be case of an electrical power system merely having passive cooling.

As illustrated, in response to the current duty cycle 83, the cell temperature profile can be seen to rise above the safe operating window, as depicted by the horizontal lines (upper boundary 88 and lower boundary 89). In particular, the cell temperature profile can be seen to rise upper limit 88 (30 degrees Celsius). Accordingly, the temperature profile 85 is shown to exceed the recommended operating limits of the cell which, in this example, is between 30 and 15 degrees Celsius.

Figure 5:
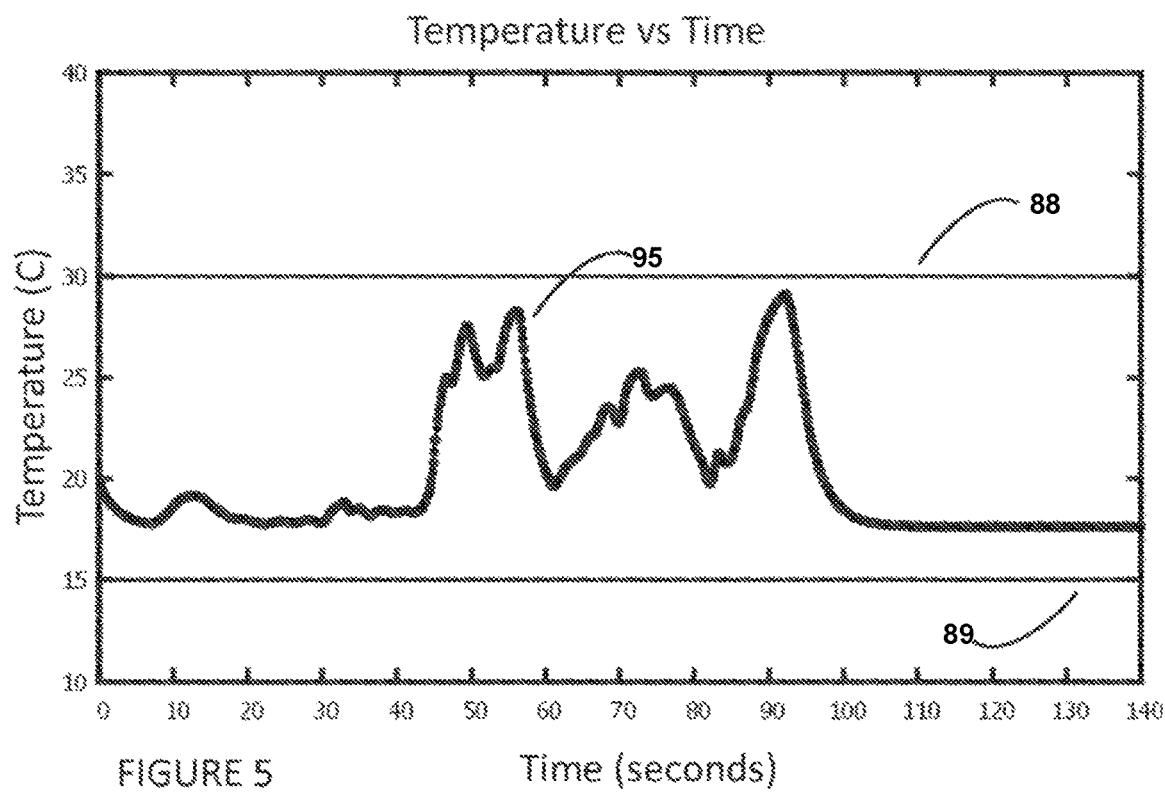
FIG. 5 graphically illustrates a temperature profile of a cell (or module)—with temperature control system set at an exemplary maximum setpoint, for purposes of illustrating the present disclosure.

FIG. 5 graphically illustrates a temperature profile of a component to be cooled, such as an energy storage cell (or module)—with its temperature control system set at an exemplary maximum setpoint, for purposes of illustrating the present disclosure. As shown, an average temperature response 95 (e.g., actual or calculated temperature) of the electronic component of interest is graphically depicted. In particular, the plot shows component temperature-verses-time having active cooling. Here, the temperature rise as a function of time represents the effect of setting a cooling system (or HVAC system) to the lower boundary 89 (setpoint of 15 degrees Celsius). In other words, here, the coolant is set at predefined temperature that will prevent the component of interest from exceeding the upper boundary 88 of allowable component temperature.

Here, the cooling system is configured to cool a battery pack (ESS) for an electric heavy duty vehicle. As shown, the average cell temperature 95 is now well within the prescribed optimal temperature range of 15 to 30 degrees Celsius (upper boundary 88 and lower boundary 89), due to the conservative thermal management. However, this is at the expense of commanding the HVAC system to operate at a high duty cycle (i.e., constantly driving the component temperature away from the upper boundary 88 and lower boundary 89), and thus consuming a maximum (or at least suboptimal) amount of energy from the vehicle battery pack, which ultimately limits the vehicle's range. As above, the component of interest's thermal response may be determined by its actual measured temperature and/or modeled by a measured current drawn.

Figure 6:
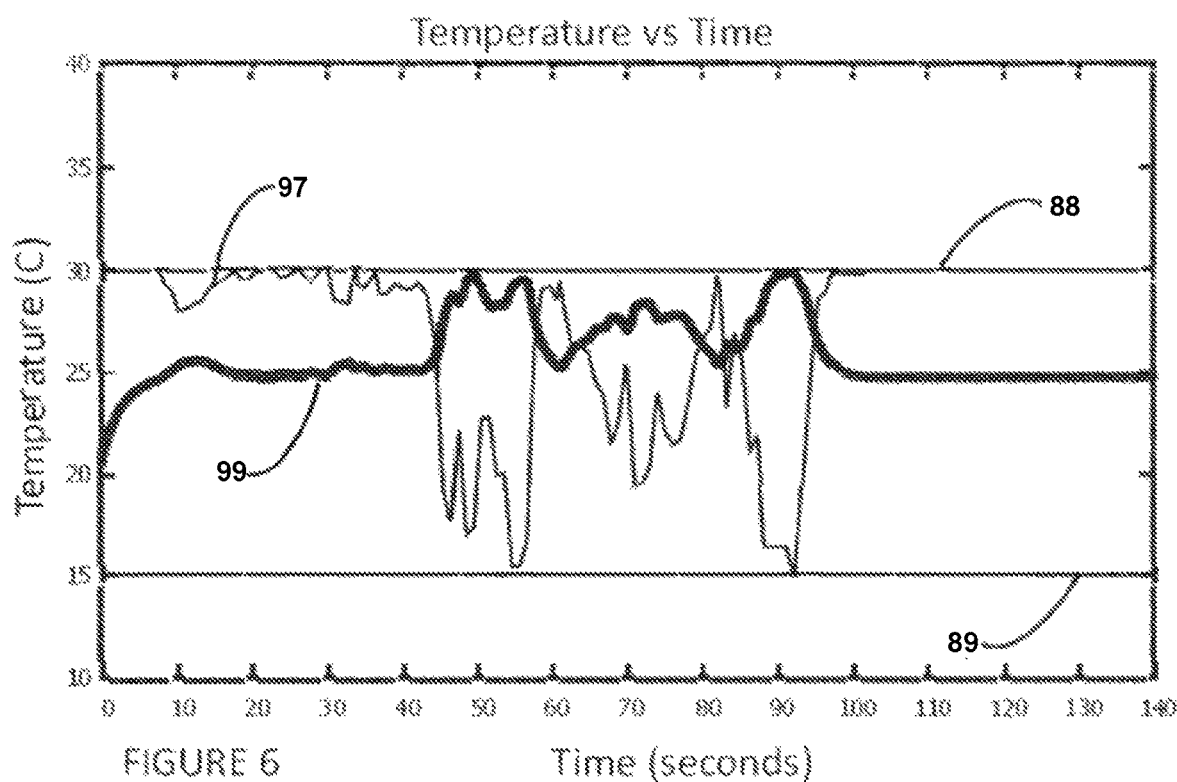
FIG. 6 graphically illustrates a temperature profile of a cell (or module)—as regulated by an embodiment of the present disclosure.

FIG. 6 graphically illustrates a temperature profile of a cell (or module)—as regulated by an embodiment of the present disclosure. In particular, an exemplary plot of component temperature-verses-time having active cooling is shown. As shown, an average temperature response 99 (e.g., actual or calculated temperature) of the electronic component of interest is graphically depicted, where its temperature response is dynamically and adaptively thermally managed.

As above, the temperature rise as a function of time represents that of a battery cell in a battery pack (ESS) for an electric heavy duty vehicle. Here, a thermal input 97 by the adaptive thermal management system 140 (FIG. 2) is shown superimposed over the average cell temperature 99 of the ESS. Thus, the active cooling setpoint may be variable rather than static, as shown.

Accordingly, and as illustrated, the adaptive thermal management system 140 adapts to "ease thermal management" during periods where the average cell temperature 99 is both away and not quickly approaching neither the upper boundary 88 nor the lower boundary 89. Conversely, and also as illustrated, the adaptive thermal management system 140 dynamically adapts to "aggressively" counteract temperature change during periods where the average cell temperature 99 is either close and/or quickly approaching one of the upper boundary 88 nor the lower boundary 89.

As above, this thermal regulation of the electric energy storage module may be responsive to an expected temperature rise of a cell in the ESS, in response to a load or anticipated load. In other words, the current measurement may act as a "temperature sensor(s) by proxy". For example, and also as above, the expected temperature rise may be numerically determined by computing a one dimension partial differential heat equation to determine the average cell temperature, or a multidimensional partial differential mass, momentum and energy equations to determine the average cell temperature. Further, this theoretical temperature rise of the cell due to current drawn may be used to compute a temperature setpoint for efficient thermal regulation of the ESS. According to one embodiment, and also as above, activating the control of a thermal conditioning device (e.g., vehicle HVAC system) may be based on sampled input signals such as duty cycle current, reference cell temperatures, and the solution of a transient partial differential heat equation that represents the properties of the ESS and/or individual cells, or any combination thereof.

Figure 7A:
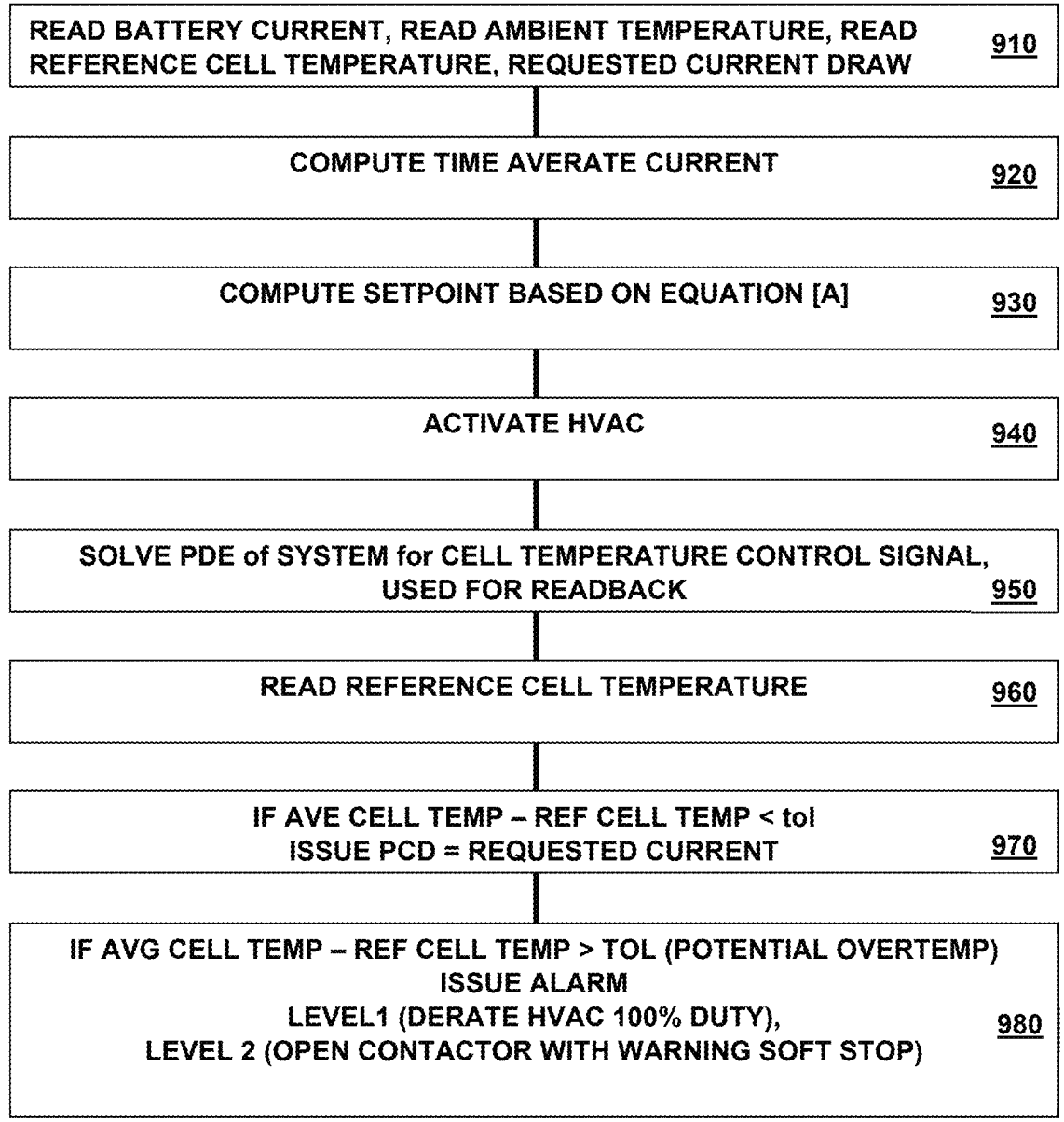
FIG. 7A is a method for dynamically managing heat in an electronic component, according to one embodiment of the present disclosure.

FIG. 7A is a method for dynamically managing heat in an electronic component, according to one embodiment of the present disclosure. In particular, the method illustrates a process to dynamically manage heat in an electric energy storage system. The method 900 may be implemented in the adaptive thermal management system 140, for example via a control unit (see e.g., adaptive thermal management controllers 150, 1150 in FIGS. 8-11)

Using a reference cell temperature and numerical cell temperature, for example, reconstructed with the use of the numerically solved partial differential equation(s) configured to represent the physical system and solve in real time the transient heat equation, allowing the simplification or reduction of thermal sensors. In one embodiment, the heat equation is solved in multidimensional form. In another embodiment, the equations of mass, momentum and energy are solved in multidimensional form.

Mathematically, "T_setpoint" represents the computed setpoint of the HVAC system in order to optimally control the battery. In some embodiments, the temperature setpoint is determined by the control expression [A]:

$$T\_setpoint = T\_setpoint\_max - M *$$
$$\left((I\_AVG * \alpha + (1-\alpha) * I\_CDR)^2 * \right.$$
$$\left. R\_internal / (A * (I\_AVG * \alpha + (1-\alpha) * I\_CDR)^B * Acell) \right)$$

where:
T_setpoint_max is the temperature maximum setpoint of the system HVAC in accordance with an embodiment;
M is a parameter determining a mapping function that maps allowable temperature rise to maximum and minimum;
I_AVG is the average current of the battery's current duty cycle (or segment thereof);
α is a weight parameter associated with current I;
I_CDR is Current Draw Request or the current requested of the vehicle's drive system; and R_internal, A, B, and/or Acell are generally considered properties and/or of the cell and energy storage cell assembly.

In some embodiments, M is determined by a mapping function that maps allowable temperature rise to maximum and minimum setpoints in an inverse manner by a linear function. In some other embodiments, the M is determined by a mapping function that maps allowable temperature rise to maximum and minimum setpoints in an inverse manner by a higher order polynomial function.

In some embodiments, the I_AVG is computed using a time average value of actual current the electrical energy storage system is delivering over a tunable preset time interval.

In some embodiments, the requested current may be used to compute the temperature setpoint.

In some embodiments, a function in the form of $K_1\alpha + (1-\alpha)K_2$ may be used to weight the average current ($K_1$=I_AVG) and a requested current ($K_2$=I_CDR) to compute a weighted average current with weight α, such that α is a number between 0 and 1.

In some embodiments, the a the a function of the energy storage state of charge ("SOC") or α=1−SOC.

In some embodiments, temperature rise ("dT") for generating time-dependent boundary conditions for a one dimensional numerical model of the battery and cell and surrounding structure is given by a temperature rise relation [B]:

$$dT = I^2 R / A I^B A cell,$$

where:
I(t)@ t=t+dt is found by interpolation between the current request points I(t) @ t=t and I(t) @ t=t+dt In some embodiments, the one dimensional time-dependent partial differential heat equation (PDE) is numerically solved to obtain a virtual average cell temperature using a one dimensional model of the cell, thus reducing the number of required sensors in the battery array In some embodiments, a multidimensional partial differential equation of continuity, momentum and energy may be numerically solved to obtain a virtual cell temperature using a geometric model of the cells, module, and system, thus reducing the number of required sensors in the battery array. In some embodiments, the partial differential equation solution is compared with T_Actual (e.g. taken from a sensor reading) to determine cells are within temperature limits, and issue a current rate to some pre-set value determine by the disclosure In some embodiments, the T_cell (e.g., a sensor reading of temperature of an energy storage cell) and the TPDE (e.g., temperature computed from the solution of a partial differential equation) are compared to determine SOH (State of Health) as time progresses, issuing a diagnostic message if the difference grows beyond bound.

In some embodiments, the controller may include a high performance numerical computation unit such as a CPU, FPGA, ASIC, GPU, DSP or plurality of this computation units in parallel.

In some embodiments, the Max_temperature_rise@C (maximum "not to be exceeded" temperature increase at "rated C" or maximum charge/discharge rate) is given by [C]:

$$Max\_temperature\_rise = I^2 R\_internal / (A I^B) A cell$$

where:
R_internal, A, B, and Acell are properties of the cell and energy storage cell assembly.

In some embodiments Max_temperature_rise ("max_dT") may specifically equal or approximate 22 degrees Celsius. In some embodiments, the Max_temperature_rise @ C is determined by a lookup table, (e.g., max_dT=22 degrees Celsius).

The embodiments may include a communication interface, a processor and an actuator. The method 900 may generally include acquiring a plurality of values based on an operating profile and parameter values that are indicative of current, and then setting operating value thresholds. In the present embodiment, the thermal management system setpoint is determined as a function of battery pack current and/or battery pack current draw request ("I_CDR") and time averaged battery current.

Battery temperature rise ("dT") is determined with a relation in the form of [D]:

$$I^2 R\_internal = hAdT,$$

where:
I is the battery current;
R_internal is the internal resistance of the battery, which may vary with the State of Charge (SOC), State of Health (SOH), and other battery cell properties;
h is a heat transfer coefficient, a property of the cell and cell package superstructure inside the battery module;
A is the cross sectional area of the cell; and
dT is the associated rise in temperature under charge and discharge current during operation.

Manufacturer cell data of the chemistry and package and/or a first principle model of the cell may be used dynamically in real time to characterize the cell used in the application. Dynamically solving a battery chemistry model is another embodiment of the present embodiment.

In the current embodiment, a temperature rise equation ("dT") is constructed using the following form [E]:

$$dT = y\_int^2 * R\_internal / \left( \left( A * y\_int^B \right) * Acell \right)$$

where:
y_int is the interpolated current, rather measured or computed current.

Other forms of this equation are possible. In another embodiment, a first principle model of the cell that characterizes the physical and electrical properties of the cell, this describing heat rise can be solved in real time within the apparatus to compute the result in the above expression.

Dynamically solving a multidimensional system of partial differential equations (PDE's) describing continuity, momentum and energy relations for the energy storage system, thermal system, and combination of energy storage system and thermal system is another embodiment of the present embodiment.

Current data as a function if time I(t) from either the vehicle simulation or real world data is used as input to the above equation to analytically determine temperature rise as a function of time.

According to one embodiment, the control rule may be developed by way of the following process:

a. Identify the maximum temperature rise for the specific cell chemistry. A source of this information can come from manufacturer's test data, physical tests conducted by a third part familiar in the art of energy storage cell testing, or a verified and calibrated first principle model that can accurately predict the temperature response of a cell to within some pre-established acceptable tolerance b. As an illustration, the maximum temperature rise based derived from manufacturer data. For illustrative purposes given the manufacturer cell data, temperature rise ranges from 0 degrees Celsius at 0 C (coulomb or Amps/sec.) charge rate to 22 degrees Celsius at 4.5 C charge rate, or maximum allowable charge rate.

c. Temperature operating limits based on the cell manufacturer's usage recommendations are established. In this present embodiment, the battery system will be operated between 30 and 15 degrees Celsius. Other ranges are possible, depending on the cell characteristics and manufacturer.

d. For maximum cell temperature rise, the thermal conditioning system must provide maximum cooling. For example, the maximum allowable temperature rise is 22 degrees. As such the corresponding setpoint is 15 degrees Celsius. When max temperature rise=0 max setpoint is 30, or off. In general, the method of determining the operating band can be tuned to the specific cell chemistry in use.

e. A mathematical function that maps temperature rise limits to setpoint limits, such that when cell temperature rise is 22 degrees Celsius, setpoint is 15 degrees Celsius is determined. In the present embodiment, the function is linear, but higher order polynomial functions are possible. If a nonlinear response in "y" (e.g., dT) is desired, such as may be required to address nonlinear control of some vehicle HVAC systems, other regression techniques that utilizes higher order polynomials can be employed. A function is determined that maps onto a range of setpoints bounded by the setpoint limits.

Using rules of functions, relations, and the condition of: temperature rise=0, setpoint=30: @ x=0, y=b=30, M=rise/run, M=−(15/22)=−0.6808.

Therefore the mapping function is [F]:

$$Y = 30 - 0.6808x$$

By analogy, 30 is the highest setpoint, M is −0.6808. This value is fixed for the required cooling range. One aspect, the temperature setpoint ("T_setpoint") is determined in real time at each time interval according to the following rule [A']:

$$T\_setpoint = T\_setpoint\_max - M * \\ \left( (I\_AVG * \alpha + (1-\alpha) * I\_CDR)^2 * \right. \\ \left. R\_internal / \left( A * (I\_AVG * \alpha + (1-\alpha) * I\_CDR)^B * Acell \right) \right)$$

where:
T_setpoint is the computed setpoint of the HVAC system in order to optimally control the battery; and
T_setpoint_max is the maximum setpoint of the system HVAC in accordance with an embodiment;
M a parameter determined by the method above. In the current example, the result is computed as M=−0.6808;
I_AVG is the average current of the battery's current duty cycle. In this example, we define a moving average of 10 seconds. Other durations are possible, and can be tuned for optimal performance.
α is a weigh parameter, α=0.2 in this example as determined by the current duty cycle, α is a number from [0:1];
I_CDR is Current Draw Request or the current requested of the vehicle's drive system; and R_internal, A, B, and/or Acell are generally considered properties and/or of the cell and energy storage cell assembly.

For example, R_internal is battery internal resistance, a function of cell properties, and can be adjusted to reflect ESR from mechanical connections, and/or which can vary with the discharge depth and cell temperature;

In some embodiments, A and B may be dimensionless coefficients associated with physical characteristics of an energy storage cell (e.g., derived curve fits); and Acell may relate to a quantitative or measurable characteristic of an energy storage cell (e.g. cross sectional area, cell value taken from an associated specification sheet, etc.).

In this aspect of the embodiment there is no need for complex conditional logic or override functions. The user can implement but it is not required. In another aspect specific to this embodiment a hybrid function of the type [G]:

$$K*I+(1-K)I\_bar,$$

where:

K is a number between 0 and 1, and

I_bar is understood as average current.

Using instantaneous current for setpoint computation only results in over compensation of cooling. Using current average only smooths out transients which results in a lack of cooling performance. Use of the tunable hybrid scheme, which as one aspect of this embodiment provides the optimal thermal regulation for control of the battery.

The computed setpoint is compared with T_v_sensor (i.e., virtual or proxy sensor temperature) and T_cell_actual (i.e., actual sensor temperature). In the present embodiment, T_cell_actual is the physical reference temperature sensor and placed in particular at every fourth cell in the module, thus reducing the overall number of sensors required for monitoring. T_v_sensors is a virtual thermistor or temperature sensor determined by computation and solution of a computation heat transfer equation in the overall controller. This allows for a reduction of sensors and also a mechanism for verifying when calibration is required. By plotting the difference between the reference temperature and the numerical cell temperature is an indication of the overall state of health of the battery which can be communicated as diagnostic information to the overall system controller for analysis. The heat equation that is solved is in the following form [H]:

$$dT/dt = k\, d^2T/dx^2$$

As illustrated in FIG. 7A, the method 900 may include the steps of: Step 910, reading battery current, ambient temperature, reference cell temperature, and requested current draw; Step 920, computing time average current; Step 930, calculating a setpoint of the thermal management system (e.g., based on Equation [A] or [A']); Step 940, activating the HVAC system accordingly; Step 950, solving a partial differential equation of system for cell temperature control signal, and use for read back; and Step 960, reading a temperature of a reference cell.

Also as illustrated, the method may further include: Step 970, issuing a command for permissible current drop (PCD) or Requested current (if the difference between the average cell temperature and the reference cell temperature is less than an allowable tolerance); or Step 980, issuing an alarm level 1 (e.g., derate HVAC from 100% duty), level 2 (open contactor with warning soft stop) (if the average cell temperature-reference cell temperature is greater than the allowable tolerance-indicating there is potential over temperature).

Figure 7B:
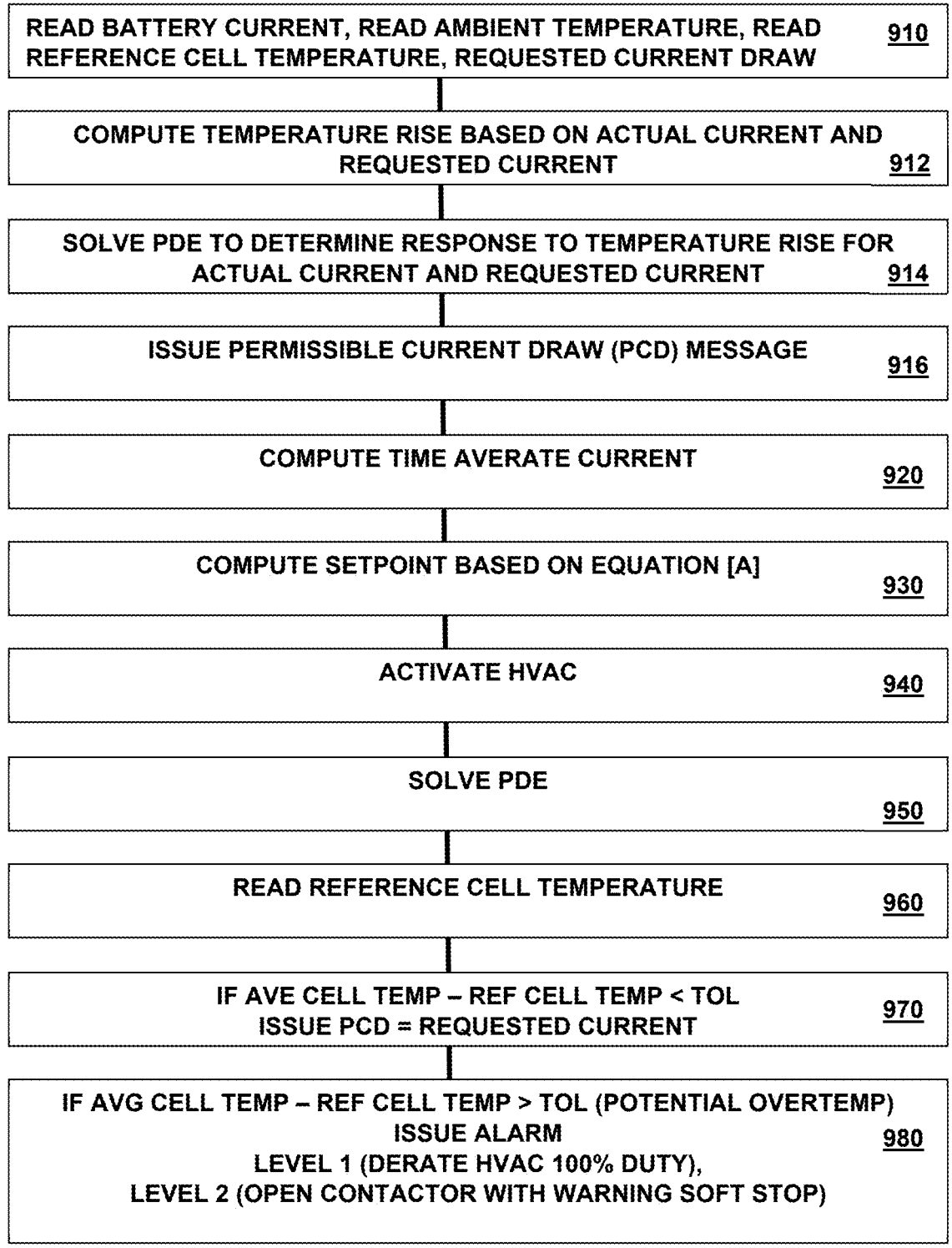
FIG. 7B is a method for dynamically manage heat in an electronic component, according to another embodiment of the present disclosure.

FIG. 7B is a method for dynamically manage heat in an electronic component, according to another embodiment of the present disclosure. In particular, the method illustrates another process to dynamically manage heat in an electric energy storage system. As illustrated, the method may include the steps of: Step 910, reading battery current, ambient temperature, reference cell temperature, and requested current draw; Step 912, computing temperature rise based on actual current and requested current; Step 914, solving a partial differential equation to determine response to temperature rise for actual current and requested current; and Step 916, issuing a permissible current draw (PCD) message.

Also as illustrated, the method may further include the steps of: Step 920, computing time average current; Step 930, calculating a setpoint of the thermal management system (e.g., based on Equation [A] or [A']); Step 940, activating the HVAC system accordingly; Step 950, solving a partial differential equation of system for cell temperature control signal, and use for read back; and Step 960, reading a temperature of a reference cell.

Also as illustrated, the method may further include: Step 970, issuing a command for permissible current drop (PCD) or Requested current (if the difference between the average cell temperature and the reference cell temperature is less than an allowable tolerance); or Step 980, issuing an alarm level 1 (e.g., derate HVAC from 100% duty), level 2 (open contactor with warning soft stop) (if the average cell temperature-reference cell temperature is greater than the allowable tolerance-indicating there is potential over temperature).

Figure 8:
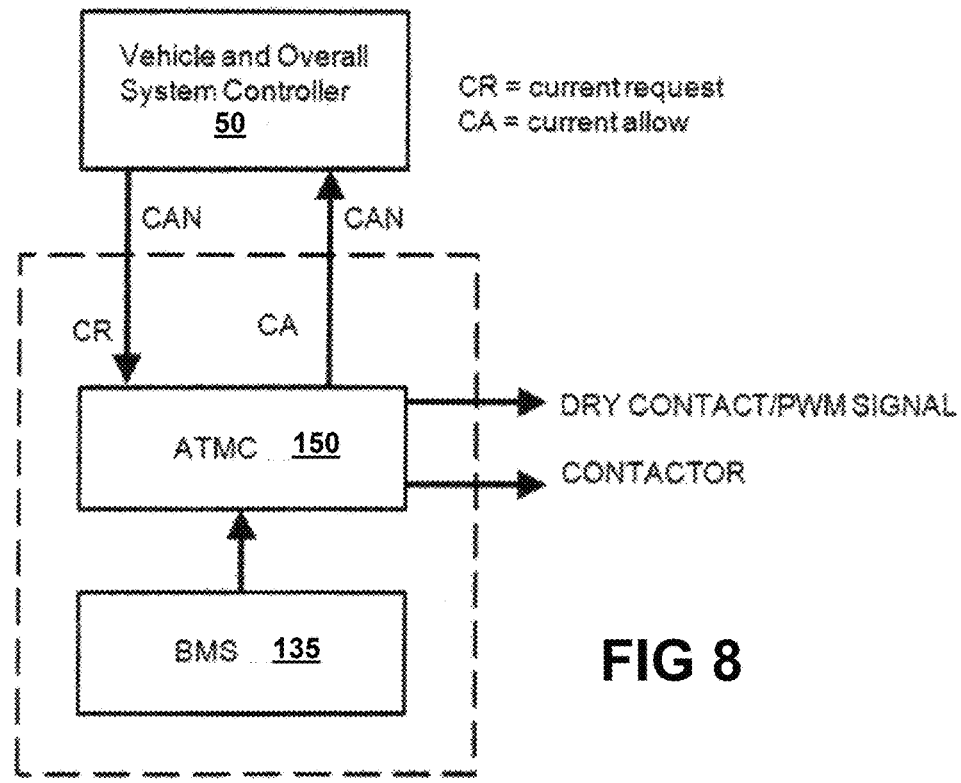
FIG. 8 illustrates a method, system, and apparatus for adaptive thermal management of an electric component (energy storage system), according to one embodiment of the present disclosure.

In some embodiments, the energy storage system and thermal management system are included in a vehicle. In some embodiments, the adaptive thermal management control unit may be included in the overall system controller of a variable electric load (e.g., an ECU/EVCU/VCU/OSC/VOSC an electric vehicle). In some embodiments, the adaptive thermal management control unit may be a stand-alone device but included in the overall vehicle FIG. 8 illustrates a method, system, and apparatus for adaptive thermal management of an electric component (energy storage system), according to one embodiment of the present disclosure. In particular, illustrated is one embodiment to dynamically manage heat in an electric energy storage system.

As above, adaptive thermal management of an electric component may be implemented via the adaptive thermal management system 140 (FIG. 2), which may include an adaptive thermal management controller (ATMC) 150 configured to thermally regulate an energy storage system (ESS) having a battery management system (BMS) 135.

The ATMC 150 may be further be configured for, inter alia, (1) actuation of contactors to connect the energy storage system to a load or power source such as the utility grid or an auxiliary power unit, and (2) to limit current drawn from the energy storage device if temperature limits are exceeded.

Also as above, the adaptive thermal management system 140 may include a communication interface, a processor and an actuator. In this embodiment, the vehicle and overall system controller 50 communicates with ATMC 150, and BMS 135 provides input to ATMC 150. Communications may include a current request (CR) and a current allow (CA). Communications may be over a Controller Area Network (CAN).

Figure 9:
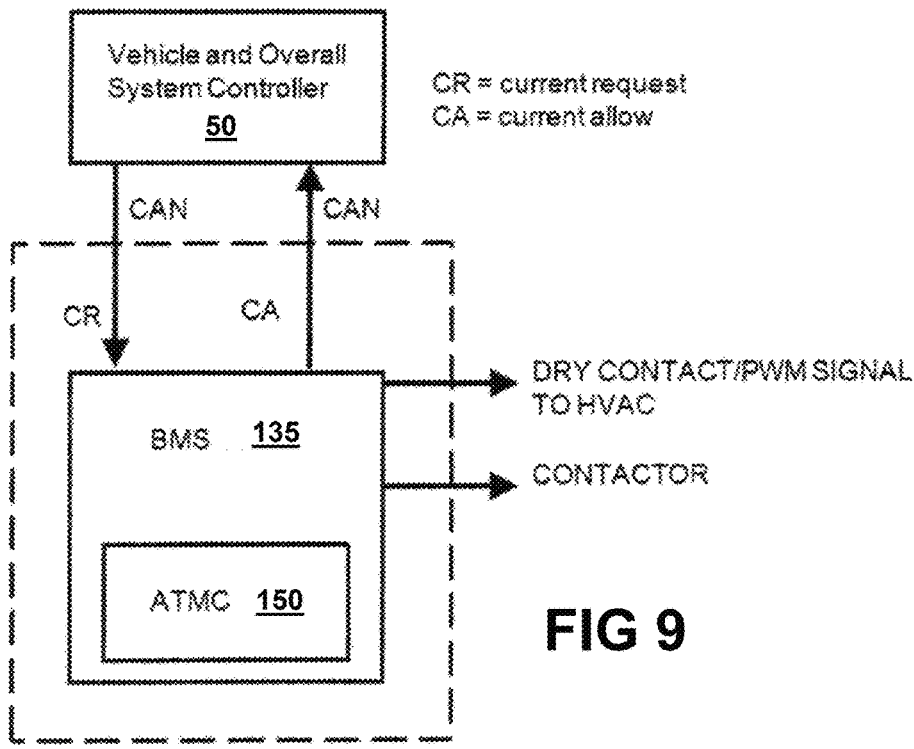
FIG. 9 illustrates a method, system, and apparatus for adaptive thermal management of an electric component (energy storage system), according to another embodiment of the present disclosure.

FIG. 9 illustrates a method, system, and apparatus for adaptive thermal management of an electric component (energy storage system), according to another embodiment of the present disclosure. In particular, illustrated is another embodiment to dynamically manage heat in an electric energy storage system.

As above, adaptive thermal management of an electric component may be implemented via the adaptive thermal management system 140 (FIG. 2), which may include an adaptive thermal management controller (ATMC 150) configured to thermally regulate an energy storage system (ESS) having a battery management system (BMS 135).

The ATMC 150 may be further be configured for, inter alia, (1) actuation of contactors to connect the energy storage system to a load or power source such as the utility grid or an auxiliary power unit, and (2) to limit current drawn from the energy storage device if temperature limits are exceeded.

Also as above, the adaptive thermal management system 140 may include a communication interface, a processor and an actuator. In this embodiment, the vehicle and overall system controller 50 communicates with BMS 135, which includes ATMC 150. As above, communications may include a current request (CR) and a current allow (CA). Communications may be over a Controller Area Network (CAN).

Figure 10:
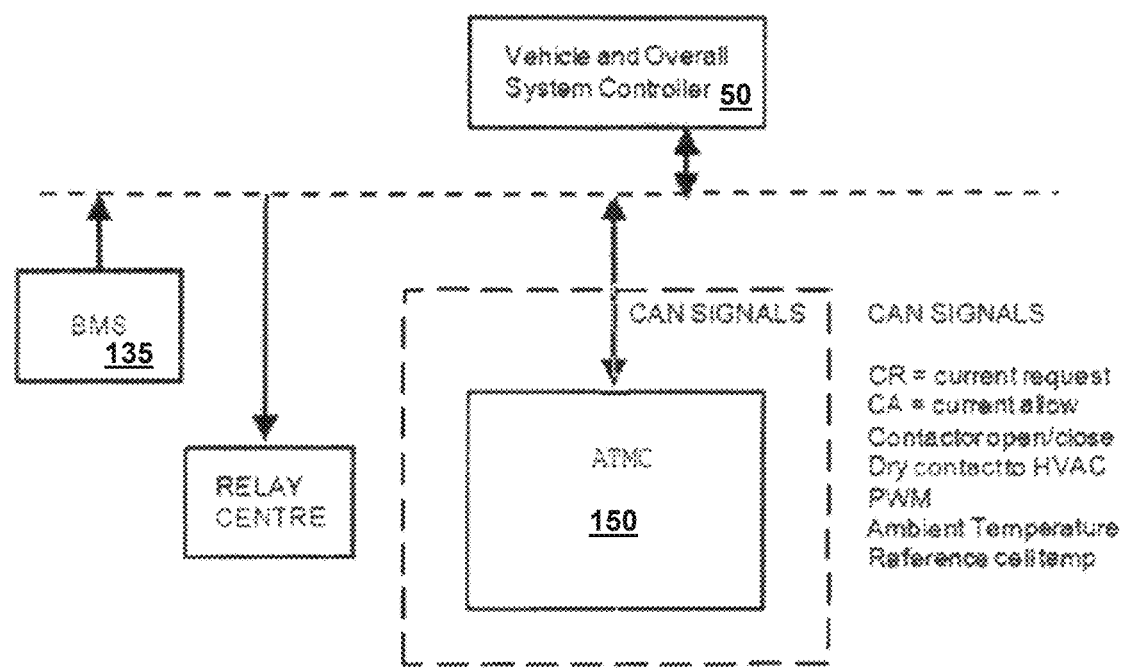
FIG. 10 illustrates a method, system, and apparatus for adaptive thermal management of an electric component (energy storage system), according to yet another embodiment of the present disclosure.

FIG. 10 illustrates a method, system, and apparatus for adaptive thermal management of an electric component (energy storage system), according to yet another embodiment of the present disclosure. In particular, illustrated is yet another embodiment to dynamically manage heat in an electric energy storage system.

As above, adaptive thermal management of an electric component may be implemented via the adaptive thermal management system 140 (FIG. 2), which may include an adaptive thermal management controller (ATMC 150) configured to thermally regulate an energy storage system (ESS) having a battery management system (BMS).

The ATMC 150 may be further be configured for, inter alia, (1) actuation of contactors to connect the energy storage system to a load or power source such as the utility grid or an auxiliary power unit, and (2) to limit current drawn from the energy storage device if temperature limits are exceeded.

Also as above, the adaptive thermal management system 140 may include a communication interface, a processor and an actuator. In this embodiment, the vehicle and overall system controller 50 may communicate with the adaptive thermal management system 140 along a bus (e.g., Controller Area Network or CAN bus. Exemplary communications may include, current requests (CR), current allow (CA). Contactor open/close, Dry contact to HVAC PWM, Ambient Temperature, Reference cell temperature, etc.

FIG. 11 is a schematic diagram of a thermally managed component (e.g., energy storage system) for a variable electric load, according to an exemplary embodiment of the present disclosure. As discussed above the thermally managed energy storage system 1100 may include an electric energy storage system 1101 including at least one energy storage module 131 (FIG. 2) having a plurality of energy storage cells, the electric energy storage system 1101 configured to electrically couple to and power the variable electric load 9, a plurality of thermal sensors 1102 configured to determine a cell temperature of at least one of the plurality of energy storage cells, a thermal management system 1108 including a heat exchanger 144 (FIG. 2), a pump 142 (FIG. 2), and a pipe system 1105 fluidly coupled together as a closed thermal loop, the thermal management system 1108 configured to thermally condition the plurality of energy storage cells by circulating a fluid through the electric energy storage system 1101, in response to a thermal control signal, and a thermal management controller 1150 communicably coupled to the variable electric load 9, to the thermal management system 1108, and to the plurality of sensors 1102. The thermal management controller 1105 may be configured to receive a current signal indicative of current being supplied from the electric energy storage system 1101 to the variable electric load 9, to receive an thermal signal from the plurality of thermal sensors 1102, the thermal signal indicative of the cell temperature of the at least one of the plurality of energy storage cells, to generate the thermal control signal based on an averaged current (I_AVE) from the electric energy storage system 1101 to the variable electric load 9, and a partial differential transient heat equation (PDE), and to communicate the thermal control signal to the thermal management system 1108.

As above, the thermally managed energy storage system 1101 may be integrated into an electric vehicle, for example, where the variable electric load 9 is a traction motor of the electric vehicle (e.g., fuel cell vehicle, ICE-EV, etc.). In some embodiments the thermal management system 1108 may be dedicated module, for example when used in a fuel cell application. Alternately, in some embodiments the thermal management system 1108 may be shared resource such as an engine or vehicle cooling system, for example when used in an internal combustion engine (ICE) application.

Alternate embodiments, discussed further below may include the thermally managed energy storage system 1101 integrated into/with an alternate energy generation system or device such as a wind turbine generator. According to one embodiment, the thermally managed energy storage system 1101 may be at least partially integrated in an overall system controller of the electric vehicle (or applicable device/system providing the variable electric load).

According to one embodiment, the thermal management controller 1150 may include a processor 1152, a memory 1154, and a communication module 1156. The communication module 1156 may be communicably coupled to the thermal management system 1108 and to the energy storage system 1101, the communication module 1156 may be configured to receive sensor data, performance data, and demand data of the energy storage system 1101, and further configured to issue thermal control commands to the thermal management system 1108. The memory 1154 may be configured to store a thermal management program, performance parameters, and logged data. The processor 1152 may be communicably coupled to the communication module 1156 and the memory 1154.

The processor 1152 may be configured to execute the thermal management program, examples of which are described above. As above, the thermal management program may be generally configured to receive a current signal via the communication module that is indicative of current being supplied from the electric energy storage system to the variable electric load, to receive an thermal signal from a plurality of thermal sensors via the communication module, the thermal signal indicative of the cell temperature of the at least one of the plurality of energy storage cells, to generate a thermal control signal by the processor 1152, and to communicate the thermal control signal to the thermal management system 1108 via the communication module 1156. As above, thermal control signal (T_setpoint) may be based on an averaged current (I_AVG) from the electric energy storage system 1101 to the variable electric load 9, and a PDE partial differential transient heat equation. Likewise, the thermal control signal may be operative to cause the thermal management system 1108 to regulate a thermal state of the electric energy storage system 1101. In other embodiments, the thermal control signal may be operative to cause the thermal management system 1108 to regulate a thermal state of a portion of the electric energy storage system 1101.

It is understood that one or more sub-modules of the thermal management controller 1150 may be combined, integrated, or otherwise share resources. Further, it should be understood the various illustrative blocks and modules described throughout can be implemented in various forms. The terms "module," "component" or "circuit" as used herein, individually or collectively refer to hardware, firmware, software and any associated hardware that executes the software, or any combination of these elements for performing the associated functions described herein. Some blocks and modules have been described above generally in terms of their functionality, which may be implemented depending upon design constraints imposed on an overall system. Skilled persons can implement the described functionality in a variety of ways in each particular application. Further, the grouping of functions within a module, block, or unit is for ease of description. Specific features or functionality can be moved from one module or block or distributed across to modules or blocks without departing from the disclosure.

The thermal management controller 1150 may include components and/or circuitry or otherwise be configured to be powered from its host system/device. For example, the thermal management controller 1150 may include a vehicle power interface coupleable to the vehicle battery and/or the electric energy storage system 1101. Further, the thermal management controller 1150 may include a voltage regulator or other power conditioning componentry configured to provide DC power of the vehicle battery to the various components of the thermal management controller 1150.

The memory 1154 may include any non-transitory computer-readable or processor-readable storage media and any associated circuitry. By way of example but not limitation, such non-transitory computer-readable or processor-readable storage media may include onboard FLASH memory, dynamic memory, RAM, ROM, EEPROM, FLASH memory, optical/magnetic disk storage, or any other medium that may be used to store desired program code in the form of instructions or data structures and that may be accessed by a processor or computer. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product. If implemented in software, the functions may be stored on or transmitted over as one or more instructions or code on a computer-readable medium.

The processor 1152 may include a general purpose processor, an integrated circuit (IC), an analog IC, a mixed signal IC, an application specific integrated circuit (ASIC), a field programmable gate array (FPGA), a digital signal processor (DSP), System on a Chip (SoC), and/or other programmable logic devices, discrete gates or transistor logic, discrete hardware components, or any combination thereof designed to perform the functions described herein. The general-purpose processor may be a microprocessor, but, in the alternative, the processor may be any conventional processor, controller, microcontroller, or state machine. The processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function. Further, the processor module 255 may be a stand-alone device or may be part of a larger device. Also, features and attributes of the specific example modules disclosed above may be combined in different ways to form additional modules or may be embodied as software and/or firmware on or of a processor the processor 1152, all of which fall within the scope of the thermal management controller 1150.

According to one embodiment, controller and/or system may also be applied to thermal management for alternative energy systems such as wind turbines and associated support equipment that are heat generating—based on current. The system/controller may cool the components of the wind turbine, such as gearboxes, power electronics, and wind dynamic control devices (e.g., wind blade pitch control systems), with the system including a controller, liquid cooling loops, pumps, fans, heat exchangers, and controller configured to compute a system of multidimensional time-dependent partial differential equations that may include a numerical representation and geometric data model of the components of the entire thermal management system connected with the components for the generation of control signals, as discussed above.

According to one embodiment, controller and/or system may also be applied to thermal management for fuel cell stacks, power modules and systems, and heat generating support equipment to cool the components of the fuel cell stacks such as cells, modules, stacks, electronics, with system comprising of controller, liquid or air cooling systems, pumps, fans, heat exchangers, refrigeration devices, thermoelectric coolers, with controller configured to compute a system of multidimensional time-dependent partial differential equations that may include a numerical representation of the entire thermal management system connected with the fuel cell system for the generation of control signals, and to compute a system of multidimensional time-dependent partial differential equations that may include a numerical representation of the entire thermal management system and the fuel cell system for the generation of control signals, as discussed above.

According to one embodiment, controller and/or system may also be applied to thermal management for alternative energy systems such solar power generation equipment and heat generating support equipment to cool the components of the solar power generation equipment such as cells, modules, power electronics, with the system including a controller, liquid or air cooling systems, pumps, fans, heat exchangers, refrigeration devices, thermoelectric coolers, with controller configured to compute a system of multidimensional time-dependent partial differential equations that may include a numerical representation of the entire thermal management system connected with the solar power system for the generation of control signals, and to compute a system of multidimensional time-dependent partial differential equations that may include a numerical representation of the entire thermal management system and the solar power system for the generation of control signals, as discussed above.

According to one embodiment, controller and/or system may also be applied to thermal management for nuclear power generation equipment and heat generating support equipment to cool the components of the device such as reactors, modules, electronics, with system comprising of controller, liquid or air cooling system, pumps, fans, heat exchangers, refrigeration devices, thermoelectric coolers, with controller configured to compute a system of multidimensional time-dependent partial differential equations that may include a numerical representation of the entire thermal management system connected with the nuclear power generation equipment and heat generating support equipment for the generation of control signals, and to compute a system of multidimensional time-dependent partial differential equations that may include a numerical representation of the entire thermal management system and the nuclear power system for the generation of control signals, as discussed above.

According to one embodiment, controller and/or system may also be applied to thermal management for grid energy storage, or battery bank energy storage equipment and heat generating support equipment to cool the components of the device such as reactors, modules, electronics, with system comprising of controller, liquid or air cooling system, pumps, fans, heat exchangers, refrigeration devices, thermoelectric coolers, with controller configured to compute a system of multidimensional time-dependent partial differential equations that may include a numerical representation of the entire thermal management system connected with the grid energy storage, or battery bank energy storage equipment and heat generating support equipment for the generation of control signals, and to compute a system of multidimensional time-dependent partial differential equations that may include a numerical representation of the entire thermal management system and the grid energy storage system, or battery bank energy storage system for the generation of control signals, as discussed above.

In some embodiments, a system of multidimensional time-dependent partial differential equations representing the entire system is solved to obtain virtual properties using a geometric model of the cells, module and system, thus reducing the number of required sensors in the system.

Application of this disclosure and principles herein may include use in high utilization medium and heavy duty vehicles. Likewise, application of this disclosure and principles herein may include use in light duty vehicles, such as passenger cars and other personal craft.

It is understood by those familiar with the art that the system described herein may be implemented in hardware, firmware, or software encoded on a non-transitory computer-readable storage medium.

The previous description of the embodiments is provided to enable any person skilled in the art to practice the disclosure. The various modifications to these embodiments will be readily apparent to those skilled in the art, and the generic principles defined herein may be applied to other embodiments without the use of inventive faculty. Thus, the present disclosure is not intended to be limited to the embodiments shown herein, but is to be accorded the widest scope consistent with the principles and novel features disclosed herein.

The invention claimed is:

1. A controller for thermal management system of a component of an electrical power system, the controller comprising:
   a communication module configured to communicably couple with the thermal management system and the electrical power system, the communication module further configured to receive a current-input-signal indicative of an electrical current of output electrical power provided by the electrical power system;
   a memory module configured to store a thermal management logic; and
   a processor module communicably coupled to the communication module and the memory module, the processor module configured to implement the thermal management logic where:
      an average of current of output electrical power provided by the electrical power system over a predetermined period of time ("averaged current") is calculated using the current-input-signal, said period of time defined by a current duty cycle that is sufficiently long to smooth current transients and sufficiently short to affect a thermal response of the component responsive to the output electrical power over the current duty cycle,
      a thermal control signal of the thermal management system is generated based on the calculated averaged current, said thermal control signal reflecting a calculated thermal performance of the component in response to the averaged current, and
      the thermal control signal is communicated to the thermal management system via the communication module, said thermal control signal operative to cause the thermal management system to regulate a thermal state of the component of the electric energy storage system.

2. The controller of claim 1, wherein the processor module is further configured to implement the thermal management logic where:
   a rate of change of the averaged current is calculated over a plurality of current duty cycles, and
   the thermal control signal of the thermal management system is generated based further on the rate of change of the averaged current.

3. The controller of claim 2, wherein the processor module is further configured to implement the thermal management logic where:
   a thermal response of the component of the electrical power system in response to the electrical current of output electrical power provided by the electrical power system is modeled, and
   the thermal control signal of the thermal management system is generated based further on the modeled thermal response.

4. The controller of claim 3, wherein the processor module is further configured to implement the thermal management logic where:
   the modeled thermal response of the component of the electrical power system in response to the averaged current is compared to a measured reference temperature, and
   the thermal control signal of the thermal management system is modified in response to a difference between the modeled thermal response and the measured reference temperature.

5. The controller of claim 1, wherein the electrical current of output electrical power provided by the electrical power system indicated by the current-input-signal is being provided by the component of the electrical power system being thermally managed.

6. The controller of claim 5, wherein the component of the electrical power system being thermally managed is an energy storage system.

7. The controller of claim 5, wherein the component of the electrical power system being thermally managed is a component of a fuel cell system.

8. The controller of claim 1, wherein the component of the electrical power system being thermally managed is a first component of the electrical power system; and
wherein the electrical current of output electrical power provided by the electrical power system indicated by the current-input-signal is being provided by a second component of the electrical power system, said second component being separate and distinct from the first component of the electrical power system.

9. The controller of claim 8, wherein the second component of the electrical power system includes at least one fuel cell.

10. The controller of claim 8, wherein the first component of the electrical power system is part of an air delivery system of a fuel cell system.

11. The controller of claim 8, wherein the second component of the electrical power system includes at least one of an energy storage and an electric energy supply.

12. The controller of claim 1, wherein predetermined period of time over which the average current is provided by the electrical power system is 10 seconds or less.

13. The controller of claim 1, wherein thermal management system of the component of the electrical power system is configured to thermally manage a plurality of components of the electrical power system.

14. A thermal management system for a component of an electrical power system, the thermal management system comprising:
a coolant energizer configured to pump a coolant through the thermal management system;
a component outlet plumbing configured to communicate the coolant out of the component of the electrical power system;
a heat exchanger fluidly coupled to the component outlet plumbing, the heat exchanger configured to extract heat from the coolant;
a component inlet plumbing fluidly coupled to the heat exchanger, the component inlet plumbing configured to communicate the coolant into the component of the electrical power system; and
a controller including
a communication module communicably coupled to the electrical power system, the communication module configured to receive a current-input-signal indicative of an electrical current of output electrical power provided by the electrical power system;
a memory module configured to store a thermal management logic; and
a processor module communicably coupled to the communication module and the memory module, the processor module configured to implement the thermal management logic where:
an average of current of output electrical power provided by the electrical power system over a predetermined period of time ("averaged current") is calculated using the current-input-signal, said period of time defined by a current duty cycle that is sufficiently long to smooth current transients and sufficiently short to affect a thermal response of the component responsive to the output electrical power over the current duty cycle, and
a thermal control signal of the thermal management system is generated based on the calculated averaged current, said thermal control signal reflecting a calculated thermal performance of the component in response to the averaged current, the thermal control signal operative to cause the thermal management system to regulate a thermal state of the component of the electric energy storage system.

15. The controller of claim 14, wherein the processor module is further configured to implement the thermal management logic where:
a rate of change of the averaged current is calculated over a plurality of current duty cycles, and
the thermal control signal of the thermal management system is generated based further on the rate of change of the averaged current.

16. The controller of claim 15, wherein the processor module is further configured to implement the thermal management logic where:
a thermal response of the component of the electrical power system in response to the electrical current of output electrical power provided by the electrical power system is modeled, and
the thermal control signal of the thermal management system is generated based further on the modeled thermal response.

17. The controller of claim 16, wherein the processor module is further configured to implement the thermal management logic where:
the modeled thermal response of the component of the electrical power system in response to the averaged current is compared to a measured reference temperature, and
the thermal control signal of the thermal management system is modified in response to a difference between the modeled thermal response and the measured reference temperature.

18. The controller of claim 17, further comprising at least one thermal sensor configured to measure the reference temperature.

19. The controller of claim 14, wherein the electrical current of output electrical power provided by the electrical power system indicated by the current-input-signal is being provided by the component of the electrical power system being thermally managed.

20. The controller of claim 19, wherein the component of the electrical power system being thermally managed is an energy storage system.

21. The controller of claim 19, wherein the component of the electrical power system being thermally managed is a component of a fuel cell system.

22. The controller of claim 14, wherein the component of the electrical power system being thermally managed is a first component of the electrical power system; and
wherein the electrical current of output electrical power provided by the electrical power system indicated by the current-input-signal is being provided by a second component of the electrical power system, said second component being separate and distinct from the first component of the electrical power system.

23. The controller of claim 22, wherein the second component of the electrical power system includes at least one fuel cell.

24. The controller of claim 22, wherein the first component of the electrical power system is part of an air delivery system of a fuel cell system.

25. The controller of claim 22, wherein the second component of the electrical power system includes at least one of an energy storage and an electric energy supply.

26. A method for thermal management of a component of an electrical power system, the method comprising:
  providing a thermal management system including
    a coolant energizer configured to pump a coolant through the thermal management system;
    a component outlet plumbing configured to communicate the coolant out of the component of the electrical power system;
    a heat exchanger fluidly coupled to the component outlet plumbing, the heat exchanger configured to extract heat from the coolant;
    a component inlet plumbing fluidly coupled to the heat exchanger, the component inlet plumbing configured to communicate the coolant into the component of the electrical power system; and
    a controller including
      a communication module communicably coupled to the electrical power system, the communication module configured to receive a current-input-signal indicative of an electrical current of output electrical power provided by the electrical power system;
      a memory module configured to store a thermal management logic; and
      a processor module communicably coupled to the communication module and the memory module, the processor module configured to implement the thermal management logic where:
        a time averaged current provided by the electrical power system over a predetermined period of time ("averaged current") is calculated based on the current-input-signal, said period of time defined by a current duty cycle that is sufficiently long to smooth current transients and sufficiently short to affect a thermal response of the component responsive to the output electrical power over the current duty cycle, and
        a thermal control signal of the thermal management system is generated based on the calculated averaged current, said thermal control signal reflecting a calculated thermal performance of the component in response to the averaged current, the thermal control signal operative to cause the thermal management system to regulate a thermal state of the component of the electric energy storage system;
  reading the current-input-signal, via the communication module of the controller;
  computing the averaged current, using the current-input-signal, and via the processor module of the controller;
  generating the thermal control signal of the thermal management system based on the computed averaged current, and via the processor module of the controller; and
  activating the thermal management system so as to regulate a thermal state of the component of the electric energy storage system, using the thermal control signal and via the communication module of the controller.

27. The method of claim 26, wherein the processor module is further configured to implement the thermal management logic where:
  a rate of change of the averaged current is calculated, and
  the thermal control signal of the thermal management system is generated based further on the rate of change of the average current.

28. The method of claim 27, wherein the processor module is further configured to implement the thermal management logic where:
  a thermal response of the component of the electrical power system in response to the electrical current of output electrical power provided by the electrical power system is modeled, and
  the thermal control signal of the thermal management system is generated based further on the modeled thermal response.

29. The method of claim 28, wherein the processor module is further configured to implement the thermal management logic where:
  the modeled thermal response of the component of the electrical power system in response to the averaged current is compared to a measured reference temperature, and
  the thermal control signal of the thermal management system is modified in response to a difference between the modeled thermal response and the measured reference temperature.

30. The method of claim 29, wherein the processor module is further configured to implement the thermal management logic where:
  the difference between the modeled thermal response and the measured reference temperature is compared to a tolerance, and
  the averaged current is limited in response to difference between the modeled thermal response and the measured reference temperature being greater than the tolerance.

31. The method of claim 26, wherein the electrical current of output electrical power provided by the electrical power system indicated by the current-input-signal is being provided by the component of the electrical power system being thermally managed; and
  wherein the component of the electrical power system being thermally managed is an energy storage system.

32. The method of claim 26, wherein the component of the electrical power system being thermally managed is a first component of an electric energy supply of the electrical power system; and
  wherein the electrical current of output electrical power provided by the electrical power system indicated by the current-input-signal is being provided by a second component of the electrical power system, said second component being separate and distinct from the first component of the electrical power system; and
  wherein the first component and the second component are part of a fuel cell system.

33. The controller of claim 14, wherein predetermined period of time over which the average current is provided by the electrical power system is 10 seconds or less.

* * * * *